(12) United States Patent
Khoshnevisan et al.

(10) Patent No.: US 12,439,414 B2
(45) Date of Patent: Oct. 7, 2025

(54) RESOLVING AMBIGUITIES RESULTING FROM OVERLAPPING PHYSICAL DOWNLINK CONTROL CHANNEL CANDIDATES OF DIFFERENT AGGREGATION LEVELS

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 17/662,208

(22) Filed: May 5, 2022

(65) Prior Publication Data
US 2022/0361221 A1 Nov. 10, 2022

Related U.S. Application Data

(60) Provisional application No. 63/201,663, filed on May 7, 2021.

(51) Int. Cl.
*H04W 72/12* (2023.01)
*H04L 1/16* (2023.01)
(Continued)

(52) U.S. Cl.
CPC ........... *H04W 72/23* (2023.01); *H04L 1/1671* (2013.01)

(58) Field of Classification Search
CPC .............. H04L 1/0072; H04L 1/0071; H04L 5/0053; H04L 5/0094; H04L 1/1671; H04L 1/0067; H04L 1/08; H04W 72/23; H04W 72/20
See application file for complete search history.

(56) References Cited

U.S. PATENT DOCUMENTS

| 8,611,249 B2 | 12/2013 | Ko et al. |
| 9,369,248 B2 | 6/2016 | Cheng et al. |
| 10,757,694 B2 | 8/2020 | Ko et al. |
(Continued)

FOREIGN PATENT DOCUMENTS

| AU | 2011262628 A1 | 1/2013 |
| EP | 2547017 A2 | 1/2013 |
| WO | 2020020780 A1 | 1/2020 |

OTHER PUBLICATIONS

Convida Wireless: "Multi-TRP Enhancements for PDCCH, PUCCH and PUSCH", 3GPP TSG-RAN WG1#104-e, R1-2101415, e-Meeting, Jan. 25-Feb. 5, 2021, pp. 1-10.
(Continued)

*Primary Examiner* — Brian D Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive configuration information identifying a plurality of physical downlink control channel (PDCCH) candidates that are to be monitored for downlink control information (DCI). The plurality of PDCCH candidates may include a PDCCH candidate having a first aggregation level and a set of linked PDCCH candidates, for repetitions of DCI, having a second aggregation level. The PDCCH candidate may overlap with one PDCCH candidate of the set of linked PDCCH candidates. The UE may communicate according to one or more rules for the PDCCH candidate overlapping with the one PDCCH candidate of the set of linked PDCCH candidates. Numerous other aspects are described.

44 Claims, 12 Drawing Sheets

700 ⟶

710 — Receive, from a base station, configuration information identifying a plurality of PDCCH candidates that are to be monitored for DCI, the plurality of PDCCH candidates including a PDCCH candidate having a first aggregation level, and linked PDCCH candidates, for repetitions of DCI, having a second aggregation level, wherein the PDCCH candidate overlaps with one of the linked PDCCH candidates 720 — Communicate with the base station according to one or more rules that resolve an ambiguity resulting from the PDCCH candidate overlapping with the one of the linked PDCCH candidates

(51) Int. Cl.
  *H04L 1/1607* (2023.01)
  *H04W 72/14* (2009.01)
  *H04W 72/23* (2023.01)

(56) References Cited

U.S. PATENT DOCUMENTS

| | | | |
|---|---|---|---|
| 2020/0351896 A1 | 11/2020 | Taherzadeh Boroujeni et al. | |
| 2021/0045099 A1 | 2/2021 | Shin et al. | |
| 2022/0022221 A1 | 1/2022 | Papasakellariou | |
| 2022/0239418 A1* | 7/2022 | Jang | H04L 1/08 |
| 2022/0330299 A1* | 10/2022 | Jang | H04W 72/1273 |
| 2024/0008024 A1* | 1/2024 | Jung | H04L 1/1812 |
| 2024/0015732 A1* | 1/2024 | Muruganathan | H04L 5/0023 |
| 2024/0129933 A1* | 4/2024 | Matsumura | H04L 5/0094 |
| 2024/0147492 A1* | 5/2024 | Gao | H04L 1/08 |
| 2024/0171252 A1* | 5/2024 | Bhamri | H04L 5/0048 |
| 2024/0205925 A1* | 6/2024 | Matsumura | H04W 72/23 |
| 2024/0205959 A1* | 6/2024 | Zhang | H04W 72/56 |

OTHER PUBLICATIONS

Moderator (Qualcomm): "Summary of Email Discussions [103-e-NR-feMIM0-02] for mTRP PDCCH Enhancements", 3GPP Draft, 3GPP TSG-RAN WG1 Meeting #103-e, R1-2009683, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 11, 2020 (Nov. 11, 2020), XP051953514, 73 Pages, sections 1-5.

Nokia, Nokia Shanghai Bell: "Summary of Open Issues Related to Rate-Matching in NR", 3GPP TSG-RAN WG1 #92, R1-1803285, Athens, Greece, Feb. 26-Mar. 2, 2018, 8 pages.

International Search Report and Written Opinion—PCT/US2022/072182—ISA/EPO—Aug. 25, 2022.

Takeda K., et al., "Understanding the Heart of the 5G Air Interface: An Overview of Physical Downlink Control Channel for 5G New Radio (NR)", Oct. 2019, pp. 1-8.

* cited by examiner

RESOLVING AMBIGUITIES RESULTING FROM OVERLAPPING PHYSICAL DOWNLINK CONTROL CHANNEL CANDIDATES OF DIFFERENT AGGREGATION LEVELS

CROSS-REFERENCE TO RELATED APPLICATION

This Patent Application claims priority to U.S. Provisional Patent Application No. 63/201,663, filed on May 7, 2021, entitled "RESOLVING AMBIGUITIES RESULTING FROM OVERLAPPING PHYSICAL DOWNLINK CONTROL CHANNEL CANDIDATES OF DIFFERENT AGGREGATION LEVELS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for resolving ambiguities resulting from overlapping physical downlink control channel (PDCCH) candidates of different aggregation levels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at user equipment (UE) includes a memory and one or more processors, coupled to the memory, configured to: receive configuration information identifying a plurality of physical downlink control channel (PDCCH) candidates that are to be monitored for downlink control information (DCI), the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and communicate according to one or more rules for the PDCCH candidate overlapping with the one PDCCH candidate of the set of linked PDCCH candidates.

In some aspects, an apparatus for wireless communication at a network node includes a memory and one or more processors, coupled to the memory, configured to: transmit, for a UE, configuration information identifying a plurality of PDCCH candidates that are to be monitored by the UE for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and communicate according to one or more rules for the PDCCH candidate overlapping with the one PDCCH candidate of the set of linked PDCCH candidates.

In some aspects, a method of wireless communication performed by an apparatus for a UE includes receiving configuration information identifying a plurality of PDCCH candidates that are to be monitored for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and communicating according to one or more rules for the PDCCH candidate overlapping with the one PDCCH candidate of the set of linked PDCCH candidates.

In some aspects, a method of wireless communication performed by an apparatus for a network node includes transmitting, for a UE, configuration information identifying a plurality of PDCCH candidates that are to be monitored by the UE for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and communicating according to one or more rules for the PDCCH candidate overlapping with the one PDCCH candidate of the set of linked PDCCH candidates.

In some aspects, a non-transitory computer-readable medium storing a set of instructions for wireless communication includes one or more instructions that, when executed by one or more processors of a UE, cause the UE to: receive configuration information identifying a plurality of PDCCH candidates that are to be monitored for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and communicate according to one or more rules for the PDCCH candidate overlapping with the one PDCCH candidate of the set of linked PDCCH candidates.

In some aspects, a non-transitory computer-readable medium storing a set of instructions for wireless communication includes one or more instructions that, when executed by one or more processors of a network node, cause the network node to: transmit, for a UE, configuration information identifying a plurality of PDCCH candidates that are to be monitored by the UE for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and communicate according to one or more rules for the PDCCH candidate overlapping with the one PDCCH candidate of the set of linked PDCCH candidates.

In some aspects, an apparatus for wireless communication includes means for receiving configuration information identifying a plurality of PDCCH candidates that are to be monitored for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and means for communicating according to one or more rules for the PDCCH candidate overlapping with the one PDCCH candidate of the set of linked PDCCH candidates.

In some aspects, an apparatus for wireless communication includes means for transmitting, for a UE, configuration information identifying a plurality of PDCCH candidates that are to be monitored by the UE for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and means for communicating according to one or more rules for the PDCCH candidate overlapping with the one PDCCH candidate of the set of linked PDCCH candidates.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
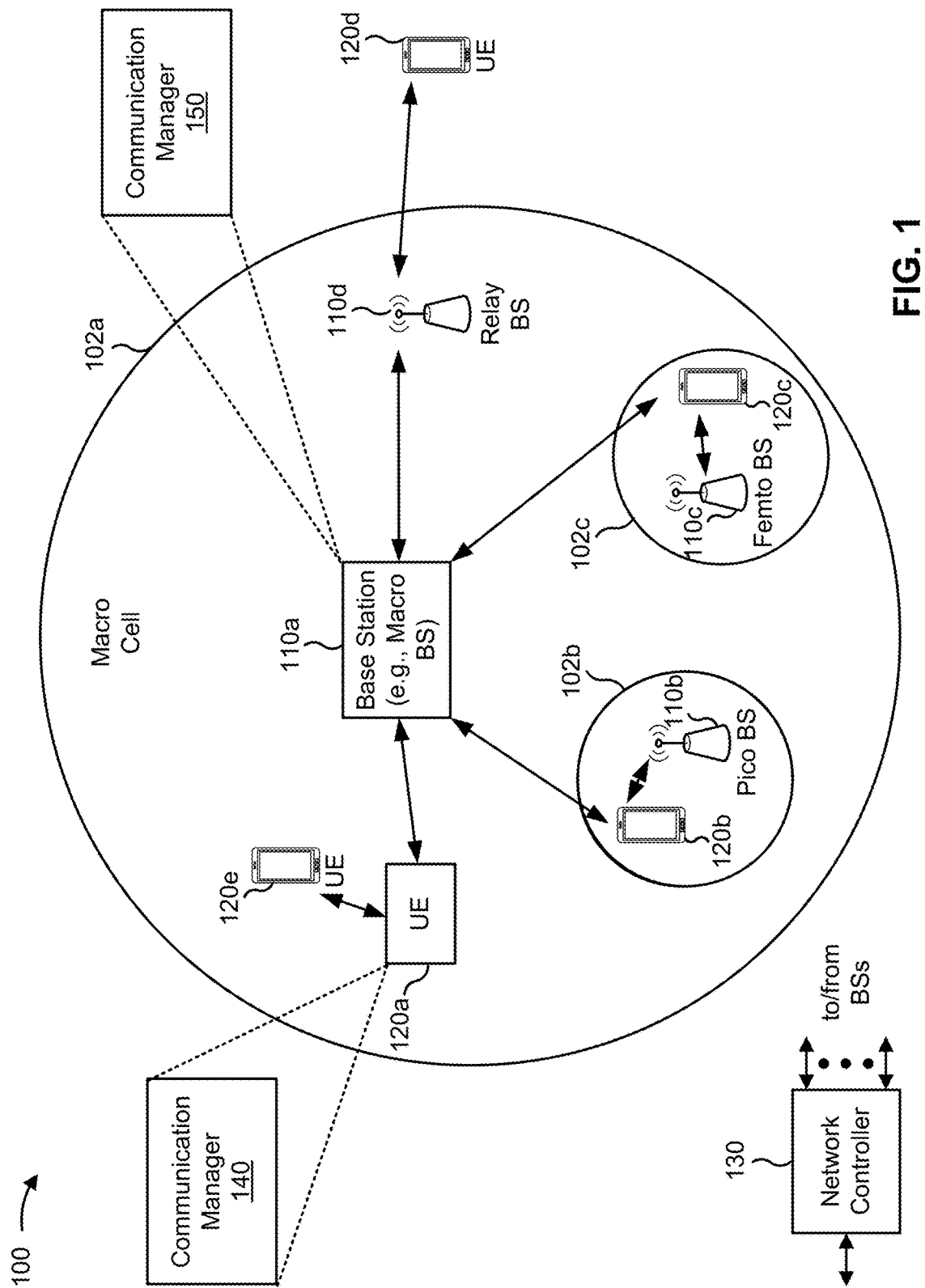
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the term "base station" (e.g., the base station 110) or "network node" or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some aspects, the UE 120 may include an apparatus for wireless communication at the UE, for example a communication manager 140. As described in more detail elsewhere herein, the communication manager 140 may receive configuration information identifying a plurality of physical downlink control channel (PDCCH) candidates that are to be monitored for downlink control information (DCI), the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and/or communicate according to one or more rules for the PDCCH candidate overlapping with the one PDCCH candidate of the set of linked PDCCH candidates. Additionally, or alternatively, the communication manager 140 may perform one or more other operations described herein.

In some aspects, the network node (e.g., a base station 110) may include an apparatus for wireless communication at the network node, for example a communication manager 150. As described in more detail elsewhere herein, the communication manager 150 may transmit, for a UE, configuration information identifying a plurality of PDCCH candidates that are to be monitored by the UE for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and/or communicate according to one or more rules for the PDCCH candidate overlapping with the one PDCCH candidate of the set of linked PDCCH candidates. Additionally, or alternatively, the communication manager 150 may perform one or more other operations described herein.

As indicated above, FIG. 1 is provided as an example. Other examples may differ from what is described with regard to FIG. 1.

Figure 2:
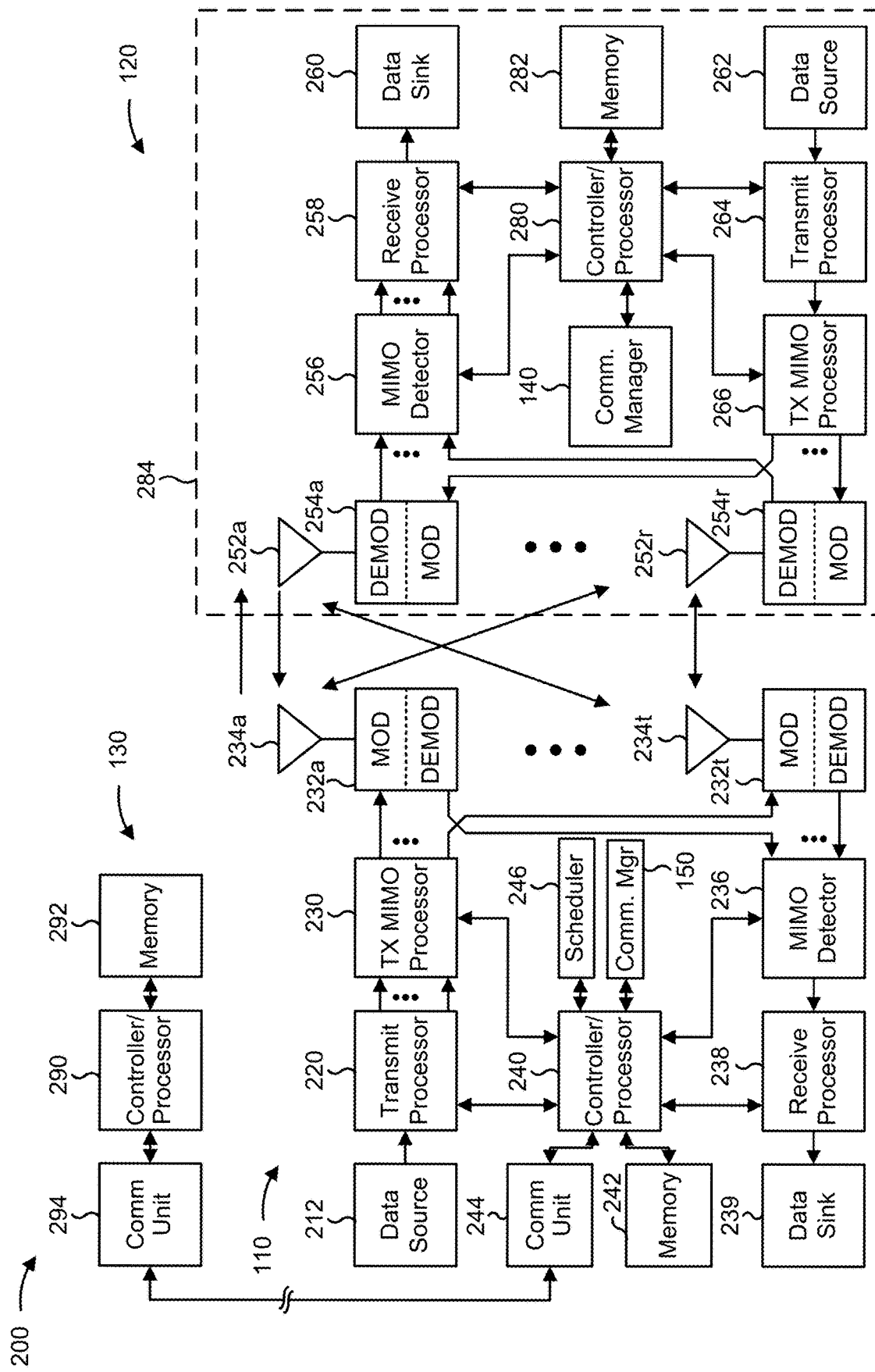
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with resolving ambiguities resulting from overlapping PDCCH candidates of different aggregation levels, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE, or apparatus for the UE, includes means for receiving configuration information identifying a plurality of PDCCH candidates that are to be monitored for DCI, the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates (e.g., using antenna 252, DEMOD 254, MIMO detector 256, receive processor 258, controller/processor 280, memory 282, or the like); and/or means for communicating according to one or more rules for the PDCCH candidate overlapping with the one PDCCH candidate of the set of linked PDCCH candidates (e.g., using antenna 252, DEMOD 254, MIMO detector 256, receive processor 258, controller/processor 280, memory 282, transmit processor 264, TX MIMO processor 266, MOD 254, or the like). The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the network node (e.g., a base station), or apparatus for the network node, includes means for transmitting, for a UE, configuration information identifying a plurality of PDCCH candidates that are to be monitored by the UE for DCI, the plurality of PDCCH candidates including a PDCCH candidate having a first aggregation level, and a set of linked PDCCH candidates, for repetitions of DCI, having a second aggregation level, wherein the PDCCH candidate overlaps with one PDCCH candidate of the set of linked PDCCH candidates (e.g., using controller/processor 240, transmit processor 220, TX MIMO processor 230, MOD 232, antenna 234, memory 242, or the like); and/or means for communicating according to one or more rules for the PDCCH candidate overlapping with the one PDCCH candidate of the set of linked PDCCH candidates (e.g., using controller/processor 240, transmit processor 220, TX MIMO processor 230, MOD 232, antenna 234, memory 242, DEMOD 232, MIMO detector 236, receive processor 238, or the like). The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
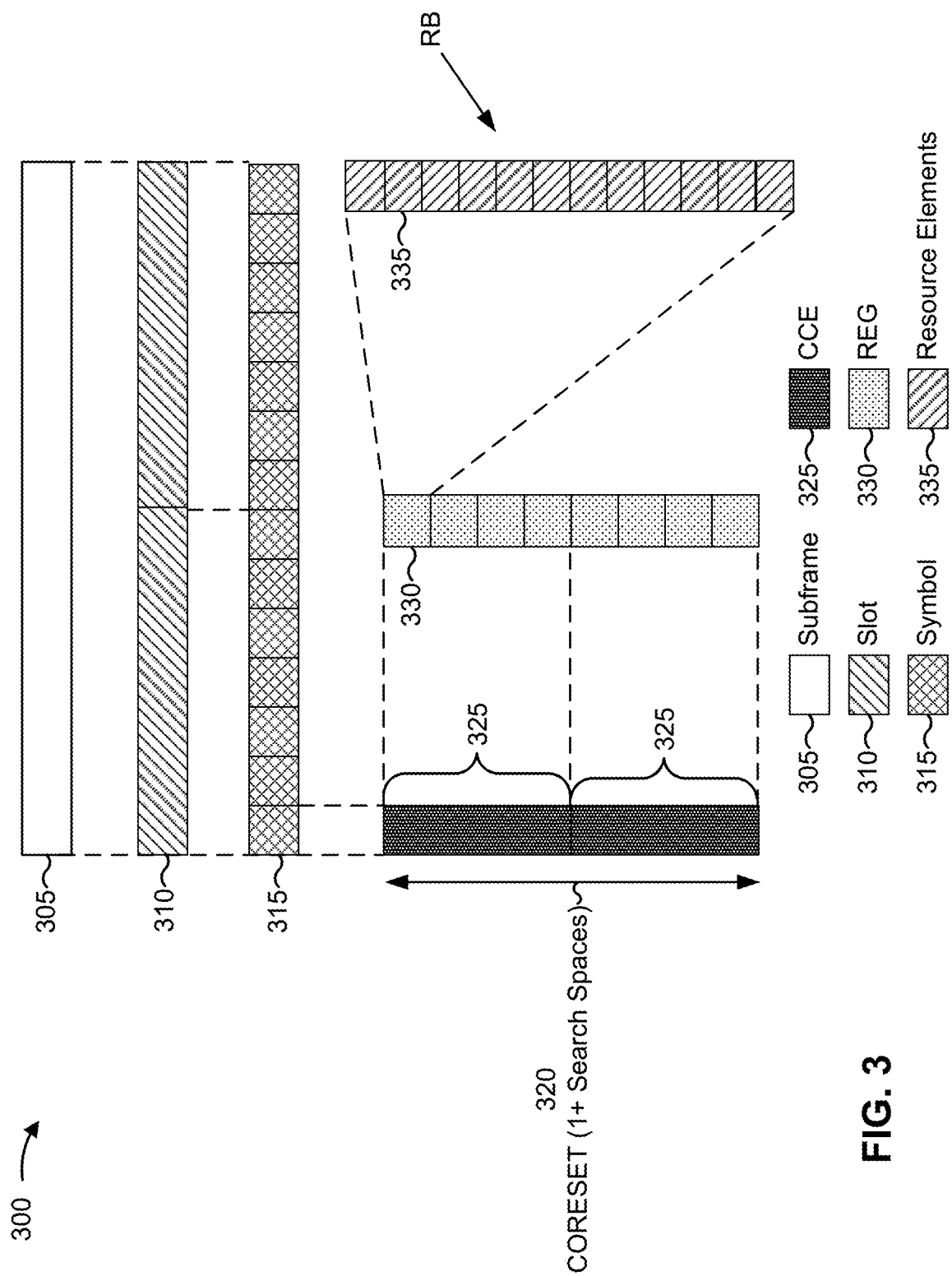
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some examples, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some examples, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320. A UE may be configured (e.g., RRC configured) with up to three (or up to five) CORESETs in a bandwidth part of a serving cell. Each CORESET may be associated with one active transmission configuration indicator (TCI) state (e.g., one active beam).

As illustrated, a symbol 315 that includes CORESET 320 may include one or more control channel elements (CCEs) 325, shown as two CCEs 325 as an example, that span a portion of the system bandwidth. A CCE 325 may include DCI that is used to provide control information for wireless communication. A base station may transmit DCI in multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330 or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A UE may be configured (e.g., RRC configured) with one or more SS sets (e.g., up to ten SS sets in a bandwidth part of a serving cell), and each SS set may be associated with one CORESET (whereas a CORESET may be associated with multiple SS sets). A configuration for an SS set may indicate an associated CORESET; a periodicity and/or an offset for slots that are to be monitored and symbols within a slot that are to be monitored, which define PDCCH monitoring occasions of the SS set; a type of the SS set (e.g., a common SS set or a UE-specific SS set); one or more DCI formats that are to be monitored; and a quantity of PDCCH candidates included in the SS set per aggregation level (e.g., per quantity of CCEs). Thus, the configuration for an SS set indicates a plurality of PDCCH candidates that are associated with respective aggregation levels and respective candidate indices.

As described above, a UE may receive DCI in one or more PDCCH candidates. For example, the UE may monitor the PDCCH candidates in the configured SS sets. The UE may perform blind decoding in the PDCCH candidates to detect DCI in one or more PDCCH candidates. For example, one or more PDCCH candidates that are successfully decoded by the UE (e.g., that pass a cyclic redundancy check (CRC)) correspond to the decoded DCI. In some examples, PDCCH candidates of different aggregation levels may overlap, and due to the blind decoding performed by the UE, it may be ambiguous to the UE as to which of the overlapping PDCCH candidates DCI is detected.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
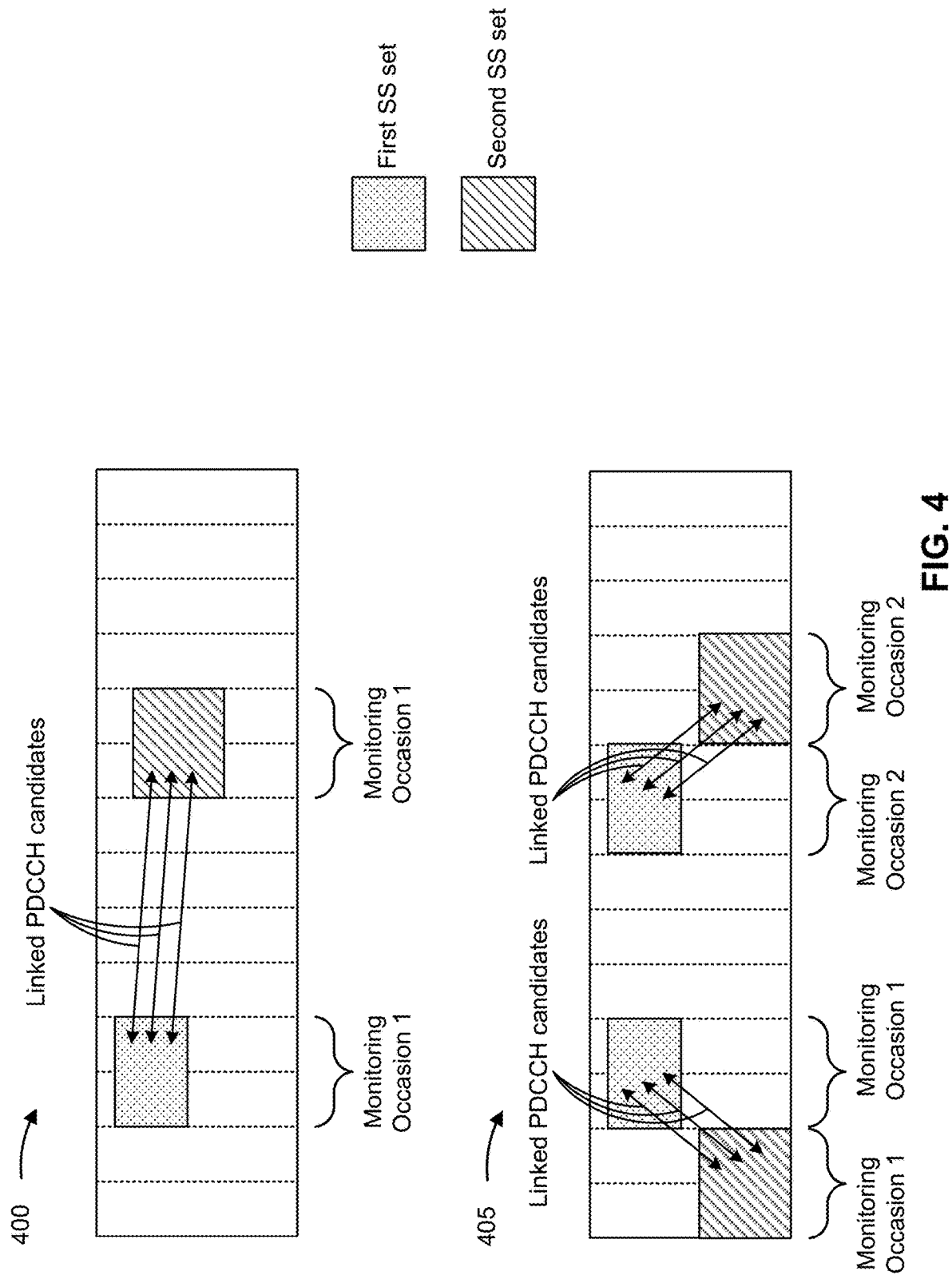
FIG. 4 is a diagram illustrating examples of physical downlink control channel (PDCCH) repetition, in accordance with the present disclosure.

FIG. 4 is a diagram illustrating examples 400 and 405 of PDCCH repetition, in accordance with the present disclosure. As shown in examples 400 and 405, multiple (e.g., two) PDCCH candidates may be linked PDCCH candidates. "Linked PDCCH candidates" refers to separate PDCCH candidates in which respective repetitions of the same DCI (e.g., the same DCI payload) may be transmitted. In other words, for PDCCH repetition using linked PDCCH candidates, each of the linked PDCCH candidates is a repetition of the same DCI. The linked PDCCH candidates may have the same aggregation level (e.g., the same quantity of CCEs). A UE may perform soft combining (e.g., combining of the repetitions) in order to decode repetitions of DCI in linked PDCCH candidates. Additionally, or alternatively, a UE may attempt to individually decode the linked PDCCH candidates.

A UE may store information that indicates the linking of PDCCH candidates (e.g., the UE knows the linking of the PDCCH candidates prior to decoding). For example, the UE may receive one or more configurations (e.g., RRC configurations) that indicate the linking of PDCCH candidates. As an example, the UE may receive a configuration that indicates a linking of multiple (e.g., two) SS sets. The linking of the SS sets may indicate that the monitoring occasions of one of the SS sets is one-to-one mapped with the monitoring occasions of the other of the SS sets. In other words, a first monitoring occasion of a first SS set may be mapped to a first monitoring occasion of a second SS set, a second monitoring occasion of the first SS set may be mapped to a second monitoring occasion of the second SS set, and so forth. Moreover, the linking of the SS sets may indicate that PDCCH candidates, of the respective SS sets, associated with the same aggregation level and the same candidate index are linked. In other words, a PDCCH candidate, of a first SS set, associated with a particular aggregation level and a particular candidate index, is linked to a PDCCH candidate, of a second SS set, associated with the particular aggregation level and the particular candidate index. Thus, the linked SS sets may respectively include the same quantity of PDCCH candidates for a particular aggregation level.

In example 400, PDCCH candidates of a first SS set, in a first monitoring occasion of the first SS set, may be linked to PDCCH candidates of a second SS set in a first monitoring occasion of the second SS set. That is, a PDCCH candidate, associated with an aggregation level and a candidate index, in the first monitoring occasion of the first SS set is linked to a PDCCH candidate, associated with the aggregation level and the candidate index, in the first monitoring occasion of the second SS set. In example 405, PDCCH candidates of a first SS set, in a first monitoring occasion of the first SS set, may be linked to PDCCH candidates of a second SS set in a first monitoring occasion of the second SS set, and PDCCH candidates of the first SS set, in a second monitoring occasion of the first SS set, may be linked to PDCCH candidates of the second SS set in a second monitoring occasion of the second SS set. As shown, linked PDCCH candidates may be in the same slot (i.e., intra-slot PDCCH repetition). Additionally, or alternatively, linked PDCCH candidates may be in different slots (i.e., inter-slot PDCCH repetition).

In PDCCH repetition, transmission of repetitions of the same DCI in different monitoring occasions and different PDCCH candidates improves time and frequency diversity of the DCI. Moreover, respective repetitions of the DCI may be transmitted by different TRPs, thereby improving spatial diversity of the DCI.

As indicated above, FIG. 4 is provided as an example. Other examples may differ from what is described with respect to FIG. 4.

Figure 5A:
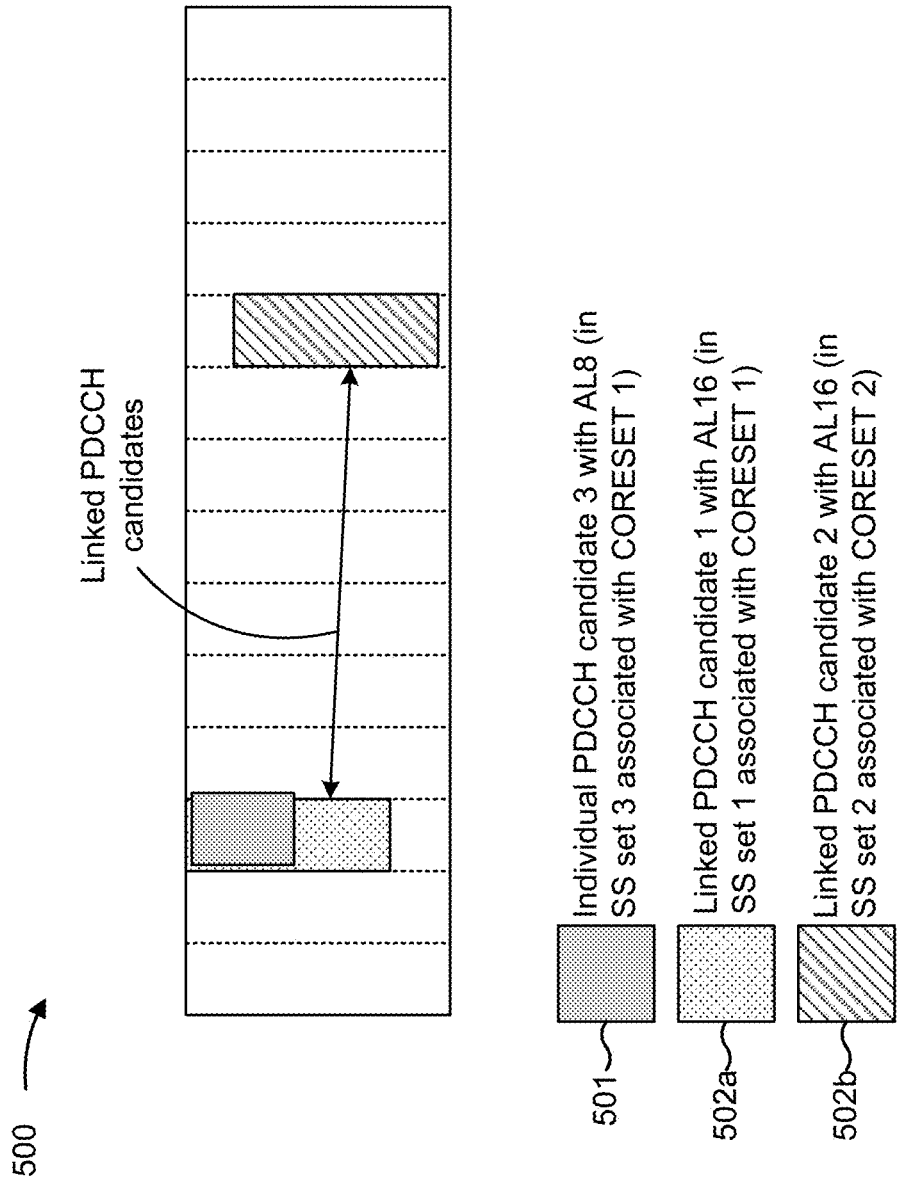
FIGS. 5A-5C are diagrams illustrating examples of overlapping PDCCH candidates, in accordance with the present disclosure.
Figure 5B:
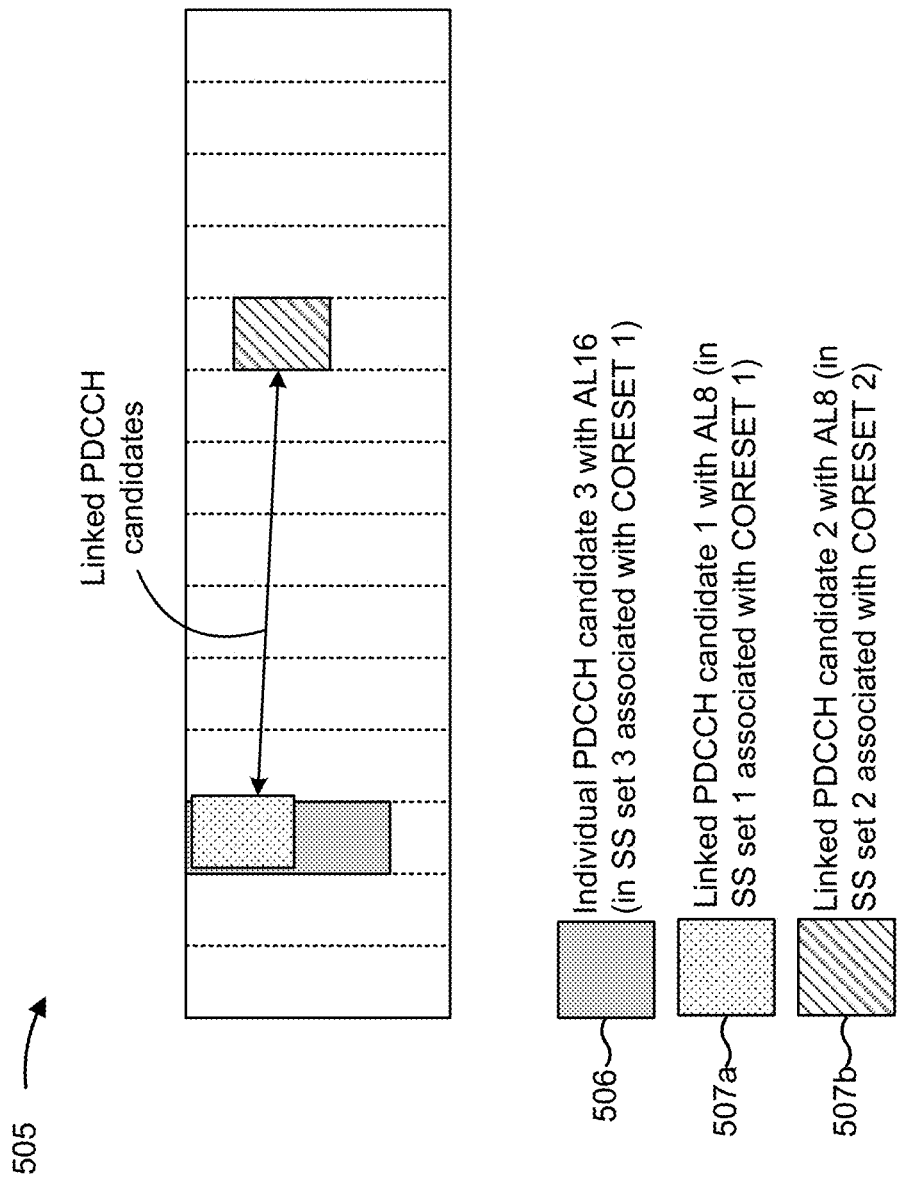
Figure 5C:
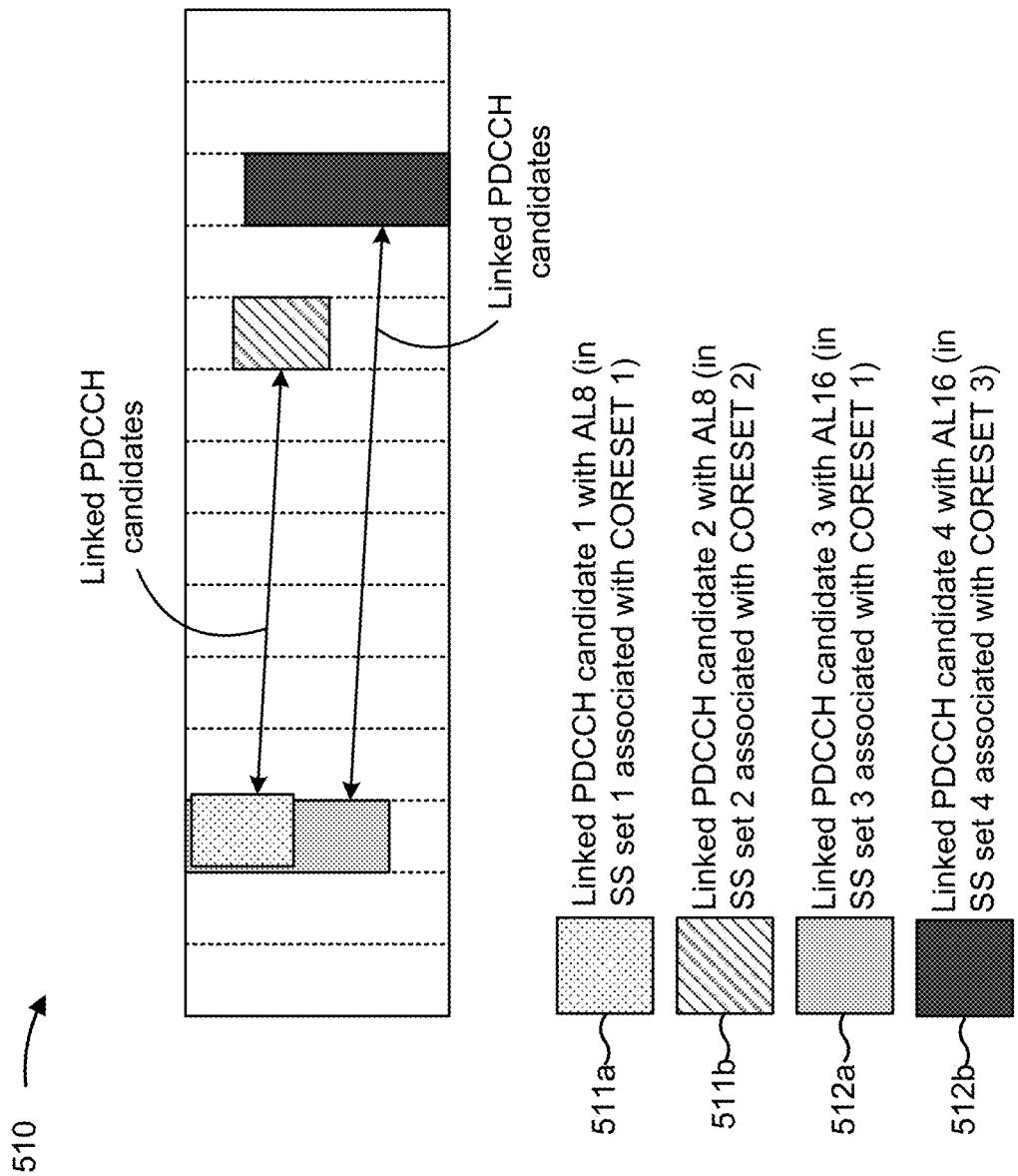

FIGS. 5A-5C are diagrams illustrating examples 500, 505, and 510, respectively, of overlapping PDCCH candidates, in accordance with the present disclosure.

In some examples, a PDCCH candidate of a first aggregation level may overlap with (e.g., in time and frequency resources) a PDCCH candidate of a second aggregation level (e.g., one or more CCEs of the PDCCH candidates may overlap). For example, a PDCCH candidate of an aggregation level of 8 (AL8) may overlap with a PDCCH candidate of an aggregation of 16 (AL16). This may result in ambiguity for a UE performing blind decoding of PDCCH candidates. For example, a PDCCH may use polar coding that uses a mother code length defined according to a quantity of coded bits, which is dependent upon a quantity of CCEs (i.e., aggregation level). An AL8 PDCCH and an AL16 PDCCH may use the same mother code length (e.g., 512 bits). For example, an AL8 PDCCH may include 864 coded bits, which may include the mother code and some of the coded bits repeated until reaching the 864 bits; an AL16 PDCCH may include 1728 coded bits, which may include the mother code repeated three times and some of the coded bits repeated until reaching the 1728 bits. As a result, the first eight CCEs of an AL16 PDCCH candidate may appear to a UE as an AL8 PDCCH candidate, thereby resulting in an ambiguity for the UE.

The ambiguity may occur when the AL8 PDCCH candidate and the AL16 PDCCH candidate have the same starting CCE index. Additionally, or alternatively, the ambiguity may occur when the AL8 PDCCH candidate and the AL16 PDCCH candidate are associated with the same CORESET (otherwise, scrambling could be configured differently for PDCCH candidates associated with different CORESETs in order to resolve the ambiguity). The AL8 PDCCH candidate and the AL16 PDCCH candidate may be associated with the same CORESET when the AL8 PDCCH candidate and the AL16 PDCCH candidate are associated with the same SS set. Alternatively, the AL8 PDCCH candidate and the AL16 PDCCH candidate may be associated with the same CORESET when the AL8 PDCCH candidate and the AL16 PDCCH candidate are associated with different SS sets that are associated with the same CORESET and that have overlapping monitoring occasions and the same DCI size. Additionally, or alternatively, the ambiguity may occur when the CORESET associated with the AL8 PDCCH candidate and the AL16 PDCCH candidate is a single symbol in the time domain (e.g., otherwise, frequency domain first-time domain second mapping of multiple symbols may resolve the ambiguity).

The ambiguity may result in a further ambiguity regarding PDSCH rate matching. In particular, if the resources carrying DCI that schedules a PDSCH overlap with the resources of the PDSCH, then the PDSCH is rate matched around the overlapping resources. Thus, a UE may receive a PDSCH using different PDSCH rate matching depending on whether a PDCCH candidate is an AL8 PDCCH candidate or an AL16 PDCCH candidate (which is ambiguous to the UE, as described above). In some examples, the resources corresponding to the AL16 PDCCH candidate may be assumed to be unavailable for the PDSCH in order to resolve the ambiguity in this scenario. That is, the UE may receive the PDSCH rate matched around the resources corresponding to the AL16 PDCCH candidate (e.g., regardless of whether the detected DCI that schedules the PDSCH is based on the AL8 candidate or the AL16 candidate) to resolve the ambiguity in this scenario.

However, other scenarios may not be resolved using the assumption described above. For example, in a scenario of example 500 of FIG. 5A, an individual (e.g., non-linked) PDCCH candidate 501 having AL8 may overlap with one of two linked PDCCH candidates 502a, 502b having AL16, and the AL8 PDCCH candidate 501 may have the same starting CCE as the AL16 linked PDCCH candidate 502a. In a scenario of example 505 of FIG. 5B, an individual (e.g., non-linked) PDCCH candidate 506 having AL16 may overlap with one of two linked PDCCH candidates 507a, 507b having AL8, and the AL16 PDCCH candidate 506 may have the same starting CCE as the AL8 linked PDCCH candidate 507a. In a scenario of example 510 of FIG. 5C, one of two linked PDCCH candidates 511a, 511b having AL8 may overlap with one of two linked PDCCH candidates 512a, 512b having AL16, and the AL8 linked PDCCH candidate 511a may have the same starting CCE as the AL16 linked PDCCH candidate 512a.

Ambiguities in the scenarios of examples 500, 505, and 510, may result from the overlapping PDCCH candidates being associated with the same CORESET that has a one symbol duration. In some examples, ambiguities in the scenarios of examples 500, 505, and 510, may result from the CORESET being configured with non-interleaved CCEto-REG mapping. In particular, in the scenarios of examples 500, 505, and 510, an ambiguity occurs when a UE detects a PDCCH in the AL8 PDCCH candidate, but the PDCCH was transmitted using the AL16 PDCCH candidate, and/or when a UE detects a PDCCH in the AL16 PDCCH candidate, but the PDCCH was transmitted using the AL8 PDCCH candidate.

In some examples, a UE may perform one or more procedures based at least in part on information associated with a PDCCH candidate used to detect the DCI. For example, the UE may use information associated with the PDCCH candidate to determine scheduling information, one or more resources, a timeline, a beam, or the like. When the DCI is detected using one or both of linked PDCCH candidates, an interpretation of the DCI, for performing the one or more procedures, is different from an interpretation of the DCI when the DCI is detected in an individual (e.g., non-linked) PDCCH candidate. For example, when the DCI is detected using one or both of linked PDCCH candidates, the UE may perform the one or more procedures using a reference PDCCH candidate of the two linked PDCCH candidates (e.g., regardless of which of the linked PDCCH candidates was decoded). The reference PDCCH candidate is not fixed and may be designated differently by different procedures, as described below.

In a first example procedure, in a case of PDCCH repetition, for physical uplink control channel (PUCCH) resource determination for hybrid automatic repeat request (HARQ) acknowledgment (HARQ-ACK) when the corresponding PUCCH resource set has a size larger than eight, the starting CCE index and quantity of CCEs in the CORESET of the one of the linked PDCCH candidates associated with a lowest SS set identifier (e.g., the reference PDCCH candidate) is applied. In a case that does not use PDCCH repetition, PUCCH resource determination depends on the starting CCE index and quantity of CCEs in the CORESET of the scheduling PDCCH. In a second example procedure, when a PDSCH with mapping Type B is scheduled by a DCI in PDCCH candidates that are linked for repetition, a UE does not expect the first symbol of the PDSCH to start earlier than the starting symbol of the one of the linked PDCCH candidates with a later starting symbol (e.g., the reference PDCCH candidate) and/or when the UE (e.g., configured with ReferenceofSLIV-ForDCIFormat1_2) receives a PDSCH scheduled by DCI format 1_2, the starting symbol S is relative to the starting symbol S0 of the PDCCH candidate with a later starting symbol (e.g., the reference PDCCH candidate).

In a third example procedure, when a PDSCH or channel state information reference signal (CSI-RS) is scheduled by DCI in PDCCH candidates that are linked for repetition, in order to determine a quasi-co-location (QCL) assumption for the PDSCH or the CSI-RS, the scheduling offset is based on the one of the linked PDCCH candidates that ends later in time (e.g., the reference PDCCH candidate). In a case in which DCI is not received in linked PDCCH candidates, if a time offset is less than a threshold (e.g., timeDurationForQCL), then a default QCL assumption is used (for QCL-TypeD) for a PDSCH. In a fourth example procedure, for a physical uplink shared channel (PUSCH) processing timeline (N2) and a channel state information (CSI) computation timeline (Z), a last symbol of a PDCCH is the last symbol of the one of the linked PDCCH candidates that ends later in time (e.g., the reference PDCCH candidate).

In a fifth example procedure, for Type-2 HARQ-ACK codebook, a PDCCH monitoring occasion associated with a counter downlink assignment index (DAI) or a total DAI in DCI detected in PDCCH candidates that are linked for repetition is the monitoring occasion of the earlier PDCCH candidate (e.g., the reference PDCCH candidate) of the linked PDCCH candidates. In a sixth example procedure, if a PDSCH is scheduled by DCI in PDCCH candidates that are linked for repetition, a TCI field is not present in the DCI, and a scheduling offset is equal to or larger than a threshold (e.g., timeDurationForQCL), a QCL assumption for a PDSCH is based on a CORESET with a lower identifier among the two CORESETs associated with the linked PDCCH candidates (e.g., a CORESET associated with the reference PDCCH candidate). In a seventh example procedure, if a PDSCH is scheduled by DCI in PDCCH candidates that are linked for repetition, and the resources of the PDCCH candidates overlap with the resources of the PDSCH, the PDSCH is rate matched around the resources of both PDCCH candidates (e.g., both PDCCH candidates are reference PDCCH candidates).

Thus, in the scenarios of examples 500 and 505, it is unclear whether the one or more procedures are to be performed based at least in part on the individual PDCCH candidate or the linked PDCCH candidate (e.g., using a reference PDCCH candidate) associated with the overlap. In the scenarios of example 510, it is unclear whether the one or more procedures are to be performed based at least in part on the first linked PDCCH candidate or the second linked PDCCH candidate associated with the overlap. Accordingly, due to the ambiguity, the UE may perform the one or more procedures incorrectly and derive incorrect scheduling information, resources, timelines, beams, or the like, thereby resulting in failed communications, increased usage of network resources to resolve the failed communications, or the like.

Some techniques and apparatuses described herein resolve the ambiguity resulting from a PDCCH candidate of a first aggregation level overlapping with a linked PDCCH candidate of a second aggregation level (e.g., the scenarios of examples 500, 505, and 510 of FIGS. 5A-5C). In some aspects, a UE and a base station may communicate according to one or more rules that resolve the ambiguity resulting from the PDCCH candidate overlapping with the linked PDCCH candidate. In some aspects, according to the one or more rules, the UE may drop (e.g., refrain from monitoring) an overlapping PDCCH candidate (e.g., the rule may indicate that the UE is to drop the PDCCH candidate or is to drop the linked PDCCH candidate), thereby enabling the UE to determine that DCI is detected in the overlapping PDCCH candidate that is not dropped and improving a performance of communications. In some aspects, according to the one or more rules, the UE may perform one or more procedures based at least in part on an assumption that DCI is detected in the PDCCH candidate or in the linked PDCCH candidate, thereby enabling the UE to perform the procedures properly regardless of the overlapping PDCCH candidate in which the UE detects DCI and improving a performance of communications. In some aspects, according to the one or more rules, a first CRC mask is used for PDCCH candidates of the first aggregation level and a second CRC mask is used for PDCCH candidates of the second aggregation level, thereby enabling the UE to differentiate the PDCCH candidate and the linked PDCCH candidate and improving a performance of communications. In some aspects, according to the one or more rules, a first rate matching scheme is used for a PDCCH candidate of the first aggregation level and a second rate matching scheme is used for a PDCCH candidate of the second aggregation level, thereby enabling the UE to differentiate the PDCCH candidate and the linked PDCCH candidate and improving a performance of communications. In some aspects, according to the one or more rules, a first scrambling scheme is used for coded bits of a PDCCH candidate of the first aggregation level and a second scrambling scheme is used for coded bits of a PDCCH candidate of the second aggregation level, thereby enabling the UE to differentiate the PDCCH candidate and the linked PDCCH candidate and improving a performance of communications.

In this way, the ambiguity resulting from the PDCCH candidate overlapping with the linked PDCCH candidate is resolved, thereby improving the performance of communications and conserving network resources.

As indicated above, FIGS. 5A-5C are provided as examples. Other examples may differ from what is described with respect to FIGS. 5A-5C.

Figure 6:
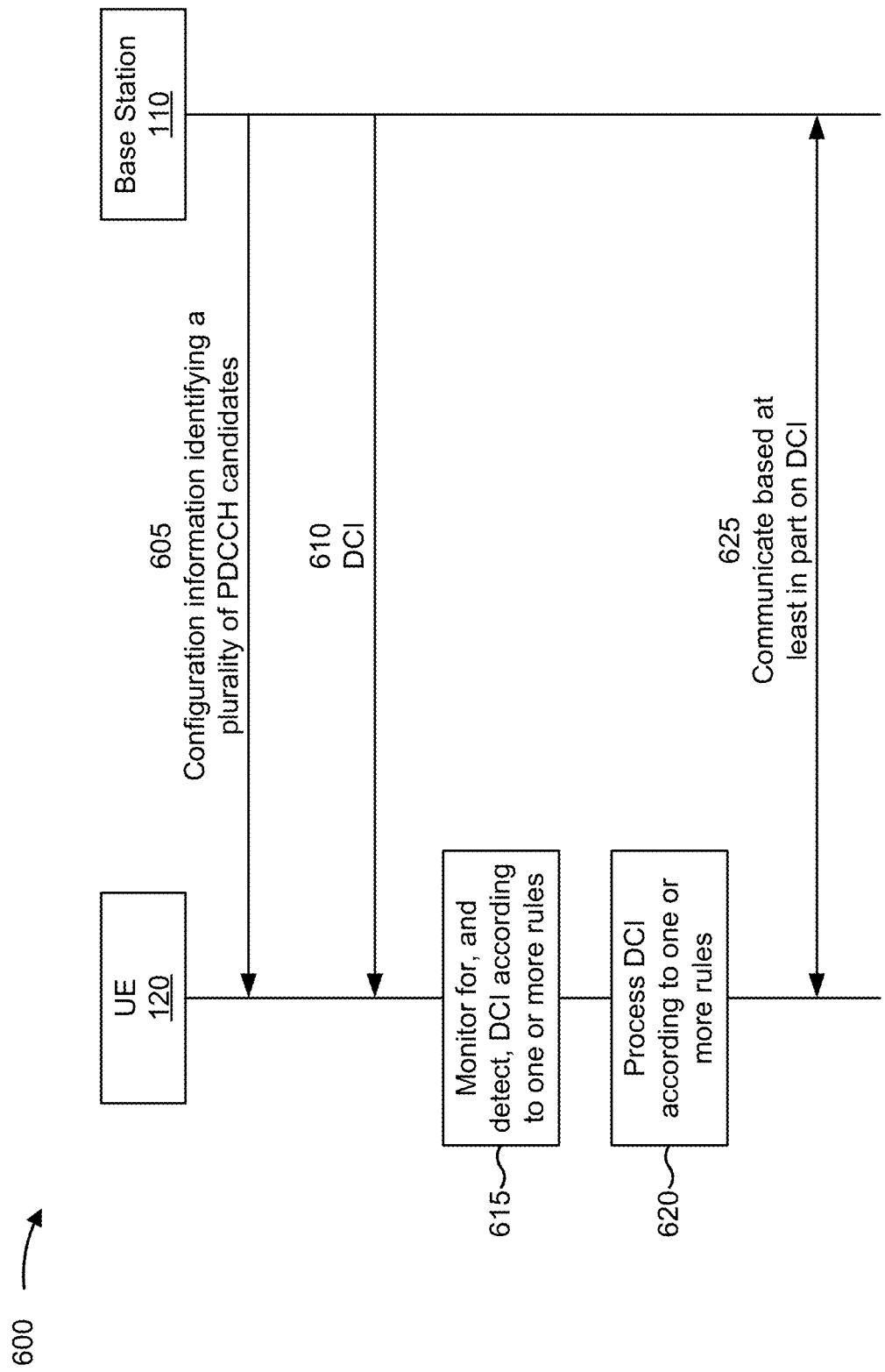
FIG. 6 is a diagram illustrating an example associated with resolving ambiguities resulting from overlapping PDCCH candidates of different aggregation levels, in accordance with the present disclosure.

FIG. 6 is a diagram illustrating an example 600 associated with resolving ambiguities resulting from overlapping PDCCH candidates of different aggregation levels, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown by reference number 605, the base station 110 may transmit, and the UE 120 may receive, configuration information identifying a plurality of PDCCH candidates that are to be monitored for DCI (e.g., information identifying the location of the plurality of PDCCH candidates that are to be monitored). That is, the plurality of PDCCH candidates may identify PDCCH resources (e.g., time and frequency resources) for which the UE 120 is to perform blind decoding for DCI. In some aspects, the configuration information identifying the plurality of PDCCH candidates may include one or more configurations (e.g., RRC configurations) for the UE 120. For example, the one or more configurations may include one or more CORESET configurations, one or more SS set configurations, and/or one or more SS set linking configurations for PDCCH repetition, as described above.

The plurality of PDCCH candidates may include a PDCCH candidate having a first aggregation level. This PDCCH candidate may be an individual PDCCH candidate (e.g., non-linked) or may be linked with another PDCCH candidate. The plurality of PDCCH candidates may also include a set of linked PDCCH candidates (e.g., two linked PDCCH candidates), for repetitions of DCI as described above, having a second aggregation level. The first aggregation level and the second aggregation level may be different. For example, the first aggregation level may be one of an aggregation level of 8 or an aggregation level of 16, and the second aggregation level may be the other of the aggregation level of 8 or the aggregation level of 16. However, other aggregation levels are contemplated by the description herein.

In some aspects, the PDCCH candidate may overlap with one of the linked PDCCH candidates (e.g., as in one of the scenarios of examples 500, 505, and 510, described above). Thus, in the description to follow, the PDCCH candidate may be referred to as the overlapping PDCCH candidate, the one of the linked PDCCH candidates may be referred to as the overlapping linked PDCCH candidate, and another one (e.g., the other one) of the linked PDCCH candidates may be referred to as the non-overlapping linked PDCCH candidate. In accordance with the one or more configurations, the overlapping PDCCH candidate may be included in a first SS set associated with a first CORESET; the overlapping linked PDCCH candidate may be included in a second SS set associated with the first CORESET; and the non-overlapping linked PDCCH candidate may be included in a third SS set associated with a second CORESET.

The overlapping of the overlapping PDCCH candidate and the overlapping linked PDCCH candidate may result in an ambiguity (e.g., the UE 120 detects a PDCCH in the overlapping PDCCH candidate of the first aggregation level, but the PDCCH was transmitted using the overlapping linked PDCCH candidate of the second aggregation level, or vice versa), as described above. For example, the ambiguity may be based at least in part on the overlapping PDCCH candidate and the overlapping linked PDCCH candidate being associated with the same CORESET, and the CORESET having a duration of only one symbol (e.g., according to the one or more configurations). Moreover, the ambiguity may be based at least in part on the overlapping PDCCH candidate and the overlapping linked PDCCH candidate having a same starting CCE (e.g., according to the one or more configurations). In some aspects, additionally or alternatively, the ambiguity may be based at least in part on a DCI size for the overlapping PDCCH candidate and the overlapping linked PDCCH candidate being the same. In some aspects, additionally or alternatively, the ambiguity may be based at least in part on the CORESET being configured with a non-interleaved CCE-to-REG mapping.

In some aspects, the UE 120 may determine that the overlapping of the overlapping PDCCH candidate and the overlapping linked PDCCH candidate, resulting in the ambiguity, is an error (e.g., an error case has occurred and the rules are not used to resolve the ambiguity). In other words, the UE 120 does not expect to be configured with CORESETs, SS sets, PDCCH candidates, and/or SS set linking that results in the overlapping of the overlapping PDCCH candidate and the overlapping linked PDCCH candidate (e.g., when the PDCCH candidates are associated with the same CORESET having a duration of one symbol and the PDCCH candidates have the same starting CCE).

In some aspects, the UE 120 may use one or more rules that resolve the ambiguity resulting from the overlapping of the overlapping PDCCH candidate and the overlapping linked PDCCH candidate (e.g., the one or more rules are for handling the overlapping of the overlapping PDCCH candidate and the overlapping linked PDCCH candidate). For example, the UE 120 may communicate with the base station 110 according to the one or more rules. Here, communicating with the base station 110 may include monitoring PDCCH candidates for DCI, detecting the DCI, decoding the DCI, processing the DCI, determining information used for one or more procedures based at least in part on the DCI (e.g., interpreting the DCI), performing the one or more procedures based at least in part on the information, exchanging communications with the base station 110 based at least in part on the one or more procedures, or the like. In some aspects, the base station 110 may transmit, and the UE 120 may receive, a configuration that indicates the one or more rules, that indicates parameters to be used for the one or more rules, and/or that indicates which of the one or more rules are to be used by the UE 120. In some aspects, the one or more rules may be fixed at the UE 120 (e.g., statically configured for the UE 120 or otherwise provisioned to the UE 120).

In some aspects, the base station 110 may also use the one or more rules to determine the behavior that is to be used by the UE 120 for resolving the ambiguity. That is, the base station 110 may communicate with the UE 120 according to the one or more rules. Here, communicating with the UE 120 may include generating DCI, encoding the DCI, transmitting the DCI, determining information used for one or more procedures based at least in part on the DCI (e.g., interpreting the DCI), determining a result of the one or more procedures based at least in part on the information, exchanging communications with the UE 120 based at least in part on the one or more procedures, or the like.

As shown by reference number 610, the base station 110 may transmit DCI for the UE 120 (e.g., group-common DCI, UE-specific DCI, or the like). The base station 110 may transmit the DCI using the overlapping PDCCH candidate. Additionally, or alternatively, the base station 110 may transmit the DCI using the overlapping linked PDCCH candidate. For example, the base station 110 (e.g., a first TRP and a second TRP of the base station 110) may transmit repetitions of the DCI using the linked PDCCH candidates. As another example, the base station 110 (e.g., a first TRP) and another base station 110 (e.g., a second TRP) may respectively transmit repetitions of the DCI using the linked PDCCH candidates. The base station 110 may transmit the DCI in accordance with the one or more rules, as described below.

As shown by reference number 615, the UE 120 may monitor for, and detect, the DCI according to the one or more rules. In some aspects, according to the one or more rules, the UE 120 may drop (e.g., refrain from monitoring) one of the overlapping PDCCH candidate or the overlapping linked PDCCH candidate. Similarly, according to the one or more rules, the base station 110 may drop (e.g., refrain from transmitting in) the one of the overlapping PDCCH candidate or the overlapping linked PDCCH candidate. In some aspects, the one of the overlapping PDCCH candidate or the overlapping linked PDCCH candidate that is dropped is associated with a lower priority (and the one that is monitored is associated with a higher priority). In this way, only one of the overlapping PDCCH candidate or the overlapping linked PDCCH candidate is monitored by the UE 120 (or used by the base station 110 for transmitting DCI), thereby resolving the ambiguity.

In some aspects, the one of the overlapping PDCCH candidate or the overlapping linked PDCCH candidate associated with a lower aggregation level has a lower priority and is dropped. For example, the one of the overlapping PDCCH candidate or the overlapping linked PDCCH candidate having an aggregation level of 8 is dropped. In some aspects, the one of the overlapping PDCCH candidate or the overlapping linked PDCCH candidate associated with a higher aggregation level has a lower priority and is dropped. For example, the one of the overlapping PDCCH candidate or the overlapping linked PDCCH candidate having an aggregation level of 16 is dropped. In other words, the priority may be based at least in part on an aggregation level associated with a PDCCH candidate.

In some aspects, the one of the overlapping PDCCH candidate or the overlapping linked PDCCH candidate that is an individual (e.g., non-linked) PDCCH candidate (e.g., the overlapping PDCCH candidate) has a lower priority and is dropped. In some aspects, the one of the overlapping PDCCH candidate or the overlapping linked PDCCH candidate that is a linked PDCCH candidate (e.g., the overlapping linked PDCCH candidate) has a lower priority and is dropped. In other words, the priority may be based at least in part on whether a PDCCH candidate is linked to another PDCCH candidate.

In some aspects, the one of the overlapping PDCCH candidate or the overlapping linked PDCCH candidate that is associated with a SS set of a higher (or lower) SS set identifier (e.g., index) has a lower priority and is dropped. In other words, the priority may be based at least in part on an SS set identifier of an SS set associated with a PDCCH candidate. For a linked PDCCH candidate (e.g., a PDCCH candidate associated with a SS set that is linked with another SS set), the SS set used for determining priority may be the SS set, of the two linked SS sets, having a lower (or higher) SS set identifier.

Accordingly, in some examples, the UE 120 may drop the overlapping linked PDCCH candidate according to the one or more rules. Here, in some aspects, the UE 120 may drop (e.g., refrain from monitoring) the non-overlapping linked PDCCH candidate if the overlapping linked PDCCH candidate is dropped (and the base station 110 may refrain from transmitting DCI in the non-overlapping linked PDCCH candidate). Alternatively, in some aspects, the UE 120 may monitor the non-overlapping linked PDCCH candidate if the overlapping linked PDCCH candidate is dropped (and the base station 110 may transmit DCI in the non-overlapping PDCCH candidate). Here, if the UE 120 detects the DCI in the non-overlapping linked PDCCH candidate, the UE 120 may determine information, used for performing one or more procedures (e.g., one or more of the first through seventh example procedures described in connection with FIGS. 5A-5C), based at least in part on a reference PDCCH candidate of the linked PDCCH candidates, as described above. Alternatively, if the UE 120 detects the DCI in the non-overlapping linked PDCCH candidate, the UE 120 may determine the information based at least in part on an assumption that the non-overlapping linked PDCCH candidate is not linked to the overlapping linked PDCCH candidate (e.g., the information is determined based at least in part on the non-overlapping linked PDCCH candidate and without using a reference PDCCH candidate).

In some aspects, the first aggregation level may be associated with a first CRC mask (e.g., a CRC scrambled using a first radio network temporary identifier (RNTI)) and the second aggregation level may be associated with a second (e.g., different) CRC mask (e.g., a CRC scrambled using a second RNTI). Thus, according to the one or more rules, the overlapping PDCCH candidate may use the first CRC mask associated with the first aggregation level, and the overlapping linked PDCCH candidate may use the second CRC mask associated with the second aggregation level. In other words, the base station 110 may transmit in the overlapping PDCCH candidate, and the UE 120 may detect/decode, DCI with a CRC scrambled by the first RNTI and/or the base station 110 may transmit in the overlapping linked PDCCH candidate, and the UE 120 may detect/decode, DCI with a CRC scrambled by the second RNTI. In this way, the UE 120 may distinguish the overlapping PDCCH candidate from the overlapping linked PDCCH candidate based at least in part on the RNTI used to decode the DCI, thereby resolving the ambiguity.

In some aspects, the UE 120 may determine information (e.g., based at least in part on the PDCCH candidate in which the DCI is received), used for performing one or more procedures (e.g., one or more of the first through seventh example procedures described in connection with FIGS. 5A-5C), based at least in part on distinguishing the overlapping PDCCH candidate from the overlapping linked PDCCH candidate according to the different RNTIs.

In some aspects, additionally or alternatively, the first aggregation level may be associated with a first rate matching scheme and the second aggregation level may be associated with a second (e.g., different) rate matching scheme.

Thus, according to the one or more rules, the overlapping PDCCH candidate may use the first rate matching scheme associated with the first aggregation level, and the overlapping linked PDCCH candidate may use the second rate matching scheme associated with the second aggregation level. In other words, the base station 110 may transmit, and the UE 120 may detect/decode, the overlapping PDCCH candidate using the first rate matching scheme and/or the base station 110 may transmit, and the UE 120 may detect/decode, the overlapping linked PDCCH candidate using the second rate matching scheme. The first rate matching scheme and the second rate matching scheme may use different starting points for reading coded bits from the mother code. In this way, the UE 120 may distinguish the overlapping PDCCH candidate from the overlapping linked PDCCH candidate because the starting coded bit for the overlapping PDCCH candidate and the overlapping linked PDCCH candidate is not the same coded bit, thereby resolving the ambiguity.

In some aspects, the UE 120 may determine information (e.g., based at least in part on the PDCCH candidate in which the DCI is received), used for performing one or more procedures (e.g., one or more of the first through seventh example procedures described in connection with FIGS. 5A-5C), based at least in part on distinguishing the overlapping PDCCH candidate from the overlapping linked PDCCH candidate according to the different rate matching schemes.

In some aspects, additionally or alternatively, the first aggregation level may be associated with a first scrambling scheme for coded bits and the second aggregation level may be associated with a second (e.g., different) scrambling scheme for coded bits. Thus, according to the one or more rules, coded bits of the overlapping PDCCH candidate may use the first scrambling scheme associated with the first aggregation level, and coded bits of the overlapping linked PDCCH candidate may use the second scrambling scheme associated with the second aggregation level. In other words, the base station 110 may transmit, and the UE 120 may detect/decode, coded bits of the overlapping PDCCH candidate using the first scrambling scheme, and/or the base station 110 may transmit, and the UE 120 may detect/decode, coded bits of the overlapping linked PDCCH candidate using the second scrambling scheme. In this way, the UE 120 may distinguish the overlapping PDCCH candidate from the overlapping linked PDCCH candidate based at least in part on the scrambling scheme used for the coded bits, thereby resolving the ambiguity.

In some aspects, the UE 120 may determine information (e.g., based at least in part on the PDCCH candidate in which the DCI is received), used for performing one or more procedures (e.g., one or more of the first through seventh example procedures described in connection with FIGS. 5A-5C), based at least in part on distinguishing the overlapping PDCCH candidate from the overlapping linked PDCCH candidate according to the different scrambling schemes for coded bits.

As shown by reference number 620, the UE 120 may process the DCI according to the one or more rules (e.g., if the DCI is detected in the overlapping PDCCH candidate and/or the overlapping linked PDCCH candidate). In some aspects, according to the one or more rules, the UE 120 is to determine information, used for performing one or more procedures (e.g., one or more of the first through seventh example procedures described in connection with FIGS. 5A-5C), based at least in part on an assumption that the DCI is detected in the overlapping linked PDCCH candidates.

That is, the UE 120 is to determine the information based at least in part on a reference PDCCH candidate of the linked PDCCH candidates. In some aspects, according to the one or more rules, the UE 120 is to determine information, used for performing one or more procedures (e.g., one or more of the first through seventh example procedures described in connection with FIGS. 5A-5C), based at least in part on an assumption that the DCI is detected in the overlapping PDCCH candidate that is non-linked. That is, the UE 120 is to determine the information without using a reference PDCCH candidate (e.g., the UE 120 is to determine the information based at least in part on the overlapping PDCCH candidate).

In some aspects, according to the one or more rules, the UE 120 is to determine information, used for performing one or more procedures (e.g., one or more of the first through seventh example procedures described in connection with FIGS. 5A-5C), based at least in part on an assumption that the DCI is detected in the overlapping linked PDCCH candidate if the overlapping linked PDCCH candidate is associated with a higher priority than the overlapping PDCCH candidate that is non-linked. In some aspects, according to the one or more rules, the UE 120 is to determine information, used for performing one or more procedures (e.g., one or more of the first through seventh example procedures described in connection with FIGS. 5A-5C), based at least in part on an assumption that the DCI is detected in the overlapping PDCCH candidate that is non-linked if the overlapping PDCCH candidate is associated with a higher priority than the overlapping linked PDCCH candidate. The priorities of the overlapping PDCCH candidate and the overlapping linked PDCCH candidate may be according to one or more of the conditions described above for determining the priorities of the overlapping PDCCH candidate and the overlapping linked PDCCH candidate for dropping a PDCCH candidate.

The UE 120 may determine the information (e.g., interpret the DCI), as described above, and the UE 120 may perform the one or more procedures using the information. For example, the UE 120 may determine the information based at least in part on a PDCCH candidate in which DCI is detected according to an assumption described above. As described above, the information may include a starting CCE index and/or a quantity of CCEs of the PDCCH candidate (e.g., for the first example procedure), a starting symbol of the PDCCH candidate (e.g., for the second example procedure), a scheduling offset for determining a QCL assumption (e.g., for the third example procedure), a last symbol of the PDCCH candidate (e.g., for the fourth example procedure), a PDCCH monitoring occasion (e.g., for the fifth example procedure), a CORESET for determining a QCL assumption (e.g., for the sixth example procedure), and/or resources for PDSCH rate matching (e.g., for the seventh example procedure), among other examples.

As described above, the UE 120 may perform the one or more procedures, using the information, to determine scheduling information, one or more resources, a timeline, a beam, or the like, used for communicating with the base station 110. Moreover, the base station 110 may also determine the information, according to the one or more rules, in order to determine the behavior that is to be used by the UE 120.

In some aspects, one of the rules described above may be used independently (e.g., to resolve the ambiguity in any of the scenarios of examples 500, 505, and 510 of FIGS. 5A-5C). In some aspects, multiple of the rules described above may be used in combination (e.g., to resolve the ambiguity in any of the scenarios of examples 500, 505, and 510 of FIGS. 5A-5C). In some aspects, different rules, or combinations of rules, may be used for the different scenarios of examples 500, 505, and 510 of FIGS. 5A-5C. For example, the scenario of example 510 of FIG. 5C may be determined to be an error, while the scenarios of examples 500 and 505 of FIGS. 5A and 5B, respectively, may be resolved according to a dropping rule and/or a rule that indicates an assumption for determining information for a procedure.

As shown by reference number 625, the base station 110 and the UE 120 may communicate based at least in part on the DCI. Moreover, the base station 110 and the UE 120 may communicate in accordance with scheduling information, one or more resources, a timeline, a beam, or the like, that is indicated by the one or more procedures.

In this way, the base station 110 and the UE 120 may communicate according to the one or more rules in order to resolve the ambiguity resulting from the overlapping of the overlapping PDCCH candidate and the overlapping linked PDCCH candidate. Accordingly, the performance of communications between the base station 110 and the UE 120 may be improved, network resources used for resolving failed communications may be conserved, or the like.

As indicated above, FIG. 6 is provided as an example. Other examples may differ from what is described with respect to FIG. 6.

Figure 7:
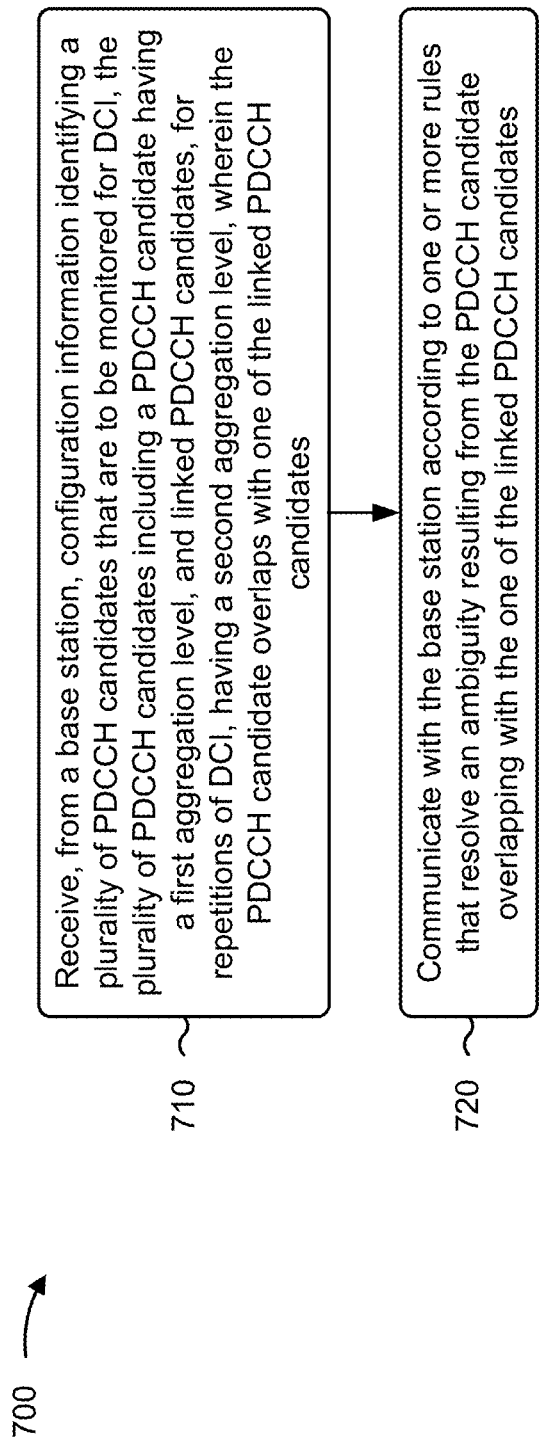
FIGS. 7-8 are diagrams illustrating example processes associated with resolving ambiguities resulting from overlapping PDCCH candidates of different aggregation levels, in accordance with the present disclosure.

FIG. 7 is a diagram illustrating an example process 700 performed, for example, by a UE, in accordance with the present disclosure. Example process 700 is an example where the UE (e.g., UE 120) performs operations associated with resolving ambiguities resulting from overlapping PDCCH candidates of different aggregation levels.

As shown in FIG. 7, in some aspects, process 700 may include receiving, from a base station, configuration information identifying a plurality of PDCCH candidates that are to be monitored for DCI, the plurality of PDCCH candidates including a PDCCH candidate having a first aggregation level, and linked PDCCH candidates, for repetitions of DCI, having a second aggregation level, wherein the PDCCH candidate overlaps with one of the linked PDCCH candidates (block 710). For example, the UE (e.g., using communication manager 140 and/or reception component 902, depicted in FIG. 9) may receive, from a base station, configuration information identifying a plurality of PDCCH candidates that are to be monitored for DCI, the plurality of PDCCH candidates including a PDCCH candidate having a first aggregation level, and linked PDCCH candidates, for repetitions of DCI, having a second aggregation level, wherein the PDCCH candidate overlaps with one of the linked PDCCH candidates, as described above, for example, with reference to FIG. 6.

As further shown in FIG. 7, in some aspects, process 700 may include communicating with the base station according to one or more rules that resolve an ambiguity resulting from the PDCCH candidate overlapping with the one of the linked PDCCH candidates (block 720). For example, the UE (e.g., using communication manager 140, reception component 902, and/or transmission component 904, depicted in FIG. 9) may communicate with the base station according to one or more rules that resolve an ambiguity resulting from the PDCCH candidate overlapping with the one of the linked PDCCH candidates, as described above, for example, with reference to FIG. 6.

Process 700 may include additional aspects, such as any single aspect or any combination of aspects described below and/or in connection with one or more other processes described elsewhere herein.

In a first aspect, the first aggregation level is one of 8 or 16 and the second aggregation level is the other of 8 or 16.

In a second aspect, alone or in combination with the first aspect, the ambiguity resulting from the PDCCH candidate and the one of the linked PDCCH candidates overlapping is based at least in part on the PDCCH candidate and the one of the linked PDCCH candidates having a same starting control channel element, and the PDCCH candidate and the one of the linked PDCCH candidates being associated with a same control resource set that has a duration of one symbol.

In a third aspect, alone or in combination with one or more of the first and second aspects, process 700 includes determining that the overlap of the PDCCH candidate and the one of the linked PDCCH candidates is an error.

In a fourth aspect, alone or in combination with one or more of the first through third aspects, communicating with the base station according to the one or more rules includes dropping the PDCCH candidate or the one of the linked PDCCH candidates.

In a fifth aspect, alone or in combination with one or more of the first through fourth aspects, a one of the PDCCH candidate or the one of the linked PDCCH candidates that is dropped has a lower priority.

In a sixth aspect, alone or in combination with one or more of the first through fifth aspects, communicating with the base station according to the one or more rules further includes dropping an other one of the linked PDCCH candidates if the one of the linked PDCCH candidates is dropped.

In a seventh aspect, alone or in combination with one or more of the first through sixth aspects, communicating with the base station according to the one or more rules further includes monitoring an other one of the linked PDCCH candidates if the one of the linked PDCCH candidates is dropped, where the DCI is detected in the other one of the linked PDCCH candidates.

In an eighth aspect, alone or in combination with one or more of the first through seventh aspects, information, used for performing one or more procedures, is based at least in part on a reference PDCCH candidate of the linked PDCCH candidates.

In a ninth aspect, alone or in combination with one or more of the first through eighth aspects, information, used for performing one or more procedures, is based at least in part on an assumption that the other one of the linked PDCCH candidates is not linked to the one of the linked PDCCH candidates.

In a tenth aspect, alone or in combination with one or more of the first through ninth aspects, according to the one or more rules, information, used for performing one or more procedures, is based at least in part on an assumption that the DCI is detected by the UE in the one of the linked PDCCH candidates.

In an eleventh aspect, alone or in combination with one or more of the first through tenth aspects, according to the one or more rules, information, used for performing one or more procedures, is based at least in part on an assumption that the DCI is detected by the UE in the PDCCH candidate that is non-linked.

In a twelfth aspect, alone or in combination with one or more of the first through eleventh aspects, according to the one or more rules, information, used for performing one or more procedures, is based at least in part on an assumption that the DCI is detected by the UE in the one of the linked PDCCH candidates if the one of the linked PDCCH candidates is associated with a higher priority than the PDCCH candidate that is non-linked, or based at least in part on an assumption that the DCI is detected by the UE in the PDCCH candidate that is non-linked if the PDCCH candidate is associated with a higher priority than the one of the linked PDCCH candidates.

In a thirteenth aspect, alone or in combination with one or more of the first through twelfth aspects, according to the one or more rules, the PDCCH candidate uses a first cyclic redundancy check mask associated with the first aggregation level, and the one of the linked PDCCH candidates uses a second cyclic redundancy check mask associated with the second aggregation level.

In a fourteenth aspect, alone or in combination with one or more of the first through thirteenth aspects, according to the one or more rules, the PDCCH candidate uses a rate matching scheme associated with the first aggregation level, and the one of the linked PDCCH candidates uses a rate matching scheme associated with the second aggregation level.

In a fifteenth aspect, alone or in combination with one or more of the first through fourteenth aspects, according to the one or more rules, coded bits of the PDCCH candidate use a scrambling scheme associated with the first aggregation level, and coded bits of the one of the linked PDCCH candidates use a scrambling scheme associated with the second aggregation level.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
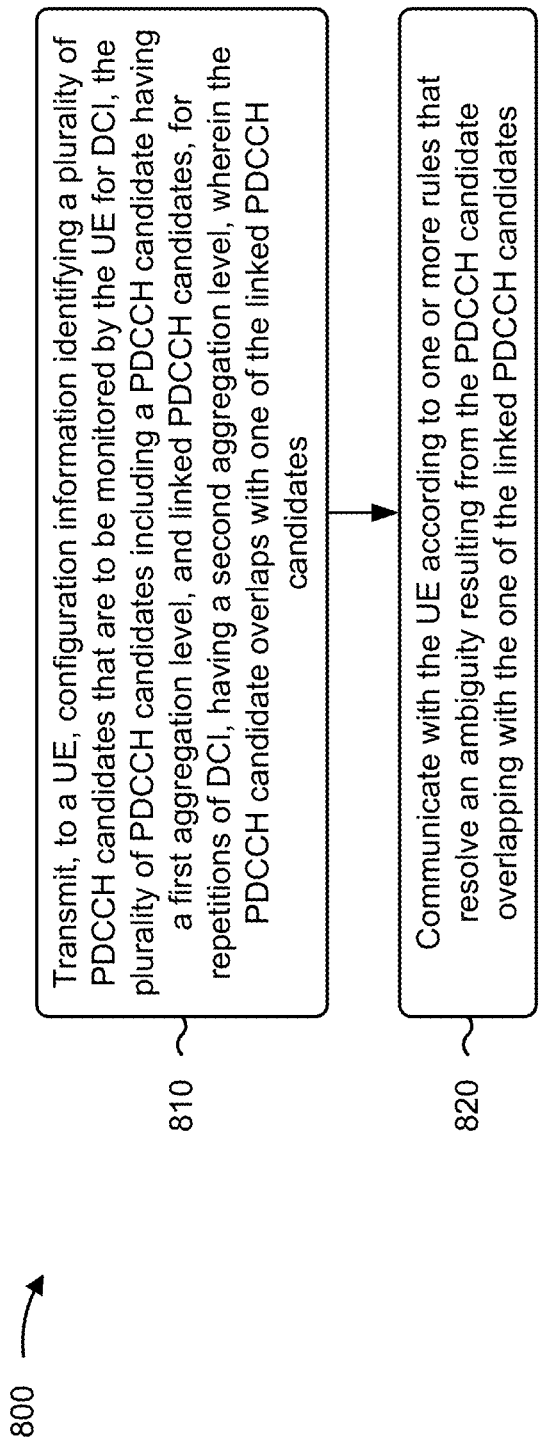

FIG. 8 is a diagram illustrating an example process 800 performed, for example, by a network node (e.g., a base station), in accordance with the present disclosure. Example process 800 is an example where the network node (e.g., base station 110) performs operations associated with resolving ambiguities resulting from overlapping PDCCH candidates of different aggregation levels.

As shown in FIG. 8, in some aspects, process 800 may include transmitting, to a UE, configuration information identifying a plurality of PDCCH candidates that are to be monitored by the UE for DCI, the plurality of PDCCH candidates including a PDCCH candidate having a first aggregation level, and linked PDCCH candidates, for repetitions of DCI, having a second aggregation level, wherein the PDCCH candidate overlaps with one of the linked PDCCH candidates (block 810). For example, the base station (e.g., using communication manager 150 and/or transmission component 1004, depicted in FIG. 10) may transmit, to a UE, configuration information identifying a plurality of PDCCH candidates that are to be monitored by the UE for DCI, the plurality of PDCCH candidates including a PDCCH candidate having a first aggregation level, and linked PDCCH candidates, for repetitions of DCI, having a second aggregation level, wherein the PDCCH candidate overlaps with one of the linked PDCCH candidates, as described above, for example, with reference to FIG. 6.

As further shown in FIG. 8, in some aspects, process 800 may include communicating with the UE according to one or more rules that resolve an ambiguity resulting from the PDCCH candidate overlapping with the one of the linked PDCCH candidates (block 820). For example, the base station (e.g., using communication manager 150, reception component 1002, and/or transmission component 1004, depicted in FIG. 10) may communicate with the UE according to one or more rules that resolve an ambiguity resulting from the PDCCH candidate overlapping with the one of the linked PDCCH candidates, as described above, for example, with reference to FIG. 6.

Process 800 may include additional aspects, such as any single aspect or any combination of aspects described below and/or in connection with one or more other processes described elsewhere herein.

In a first aspect, the first aggregation level is one of 8 or 16 and the second aggregation level is the other of 8 or 16.

In a second aspect, alone or in combination with the first aspect, the ambiguity resulting from the PDCCH candidate and the one of the linked PDCCH candidates overlapping is based at least in part on the PDCCH candidate and the one of the linked PDCCH candidates having a same starting control channel element, and the PDCCH candidate and the one of the linked PDCCH candidates being associated with a same control resource set that has a duration of one symbol.

In a third aspect, alone or in combination with one or more of the first and second aspects, process 800 includes determining that the overlap of the PDCCH candidate and the one of the linked PDCCH candidates is an error.

In a fourth aspect, alone or in combination with one or more of the first through third aspects, communicating with the UE according to the one or more rules includes dropping the PDCCH candidate or the one of the linked PDCCH candidates.

In a fifth aspect, alone or in combination with one or more of the first through fourth aspects, a one of the PDCCH candidate or the one of the linked PDCCH candidates that is dropped has a lower priority.

In a sixth aspect, alone or in combination with one or more of the first through fifth aspects, communicating with the UE according to the one or more rules further includes dropping an other one of the linked PDCCH candidates if the one of the linked PDCCH candidates is dropped.

In a seventh aspect, alone or in combination with one or more of the first through sixth aspects, communicating with the UE according to the one or more rules further includes transmitting the DCI using an other one of the linked PDCCH candidates if the one of the linked PDCCH candidates is dropped.

In an eighth aspect, alone or in combination with one or more of the first through seventh aspects, information, used for performing one or more procedures, is based at least in part on a reference PDCCH candidate of the linked PDCCH candidates.

In a ninth aspect, alone or in combination with one or more of the first through eighth aspects, information, used for performing one or more procedures, is based at least in part on an assumption that the other one of the linked PDCCH candidates is not linked to the one of the linked PDCCH candidates.

In a tenth aspect, alone or in combination with one or more of the first through ninth aspects, according to the one or more rules, information, used for performing one or more procedures, is based at least in part on an assumption that the DCI is detected by the UE in the one of the linked PDCCH candidates.

In an eleventh aspect, alone or in combination with one or more of the first through tenth aspects, according to the one or more rules, information, used for performing one or more procedures, is based at least in part on an assumption that the DCI is detected by the UE in the PDCCH candidate that is non-linked.

In a twelfth aspect, alone or in combination with one or more of the first through eleventh aspects, according to the one or more rules, information, used for performing one or more procedures, is based at least in part on an assumption that the DCI is detected by the UE in the one of the linked PDCCH candidates if the one of the linked PDCCH candidates is associated with a higher priority than the PDCCH candidate that is non-linked, or based at least in part on an assumption that the DCI is detected by the UE in the PDCCH candidate that is non-linked if the PDCCH candidate is associated with a higher priority than the one of the linked PDCCH candidates.

In a thirteenth aspect, alone or in combination with one or more of the first through twelfth aspects, according to the one or more rules, the PDCCH candidate uses a first cyclic redundancy check mask associated with the first aggregation level, and the one of the linked PDCCH candidates uses a second cyclic redundancy check mask associated with the second aggregation level.

In a fourteenth aspect, alone or in combination with one or more of the first through thirteenth aspects, according to the one or more rules, the PDCCH candidate uses a rate matching scheme associated with the first aggregation level, and the one of the linked PDCCH candidates uses a rate matching scheme associated with the second aggregation level.

In a fifteenth aspect, alone or in combination with one or more of the first through fourteenth aspects, according to the one or more rules, coded bits of the PDCCH candidate use a scrambling scheme associated with the first aggregation level, and coded bits of the one of the linked PDCCH candidates use a scrambling scheme associated with the second aggregation level.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
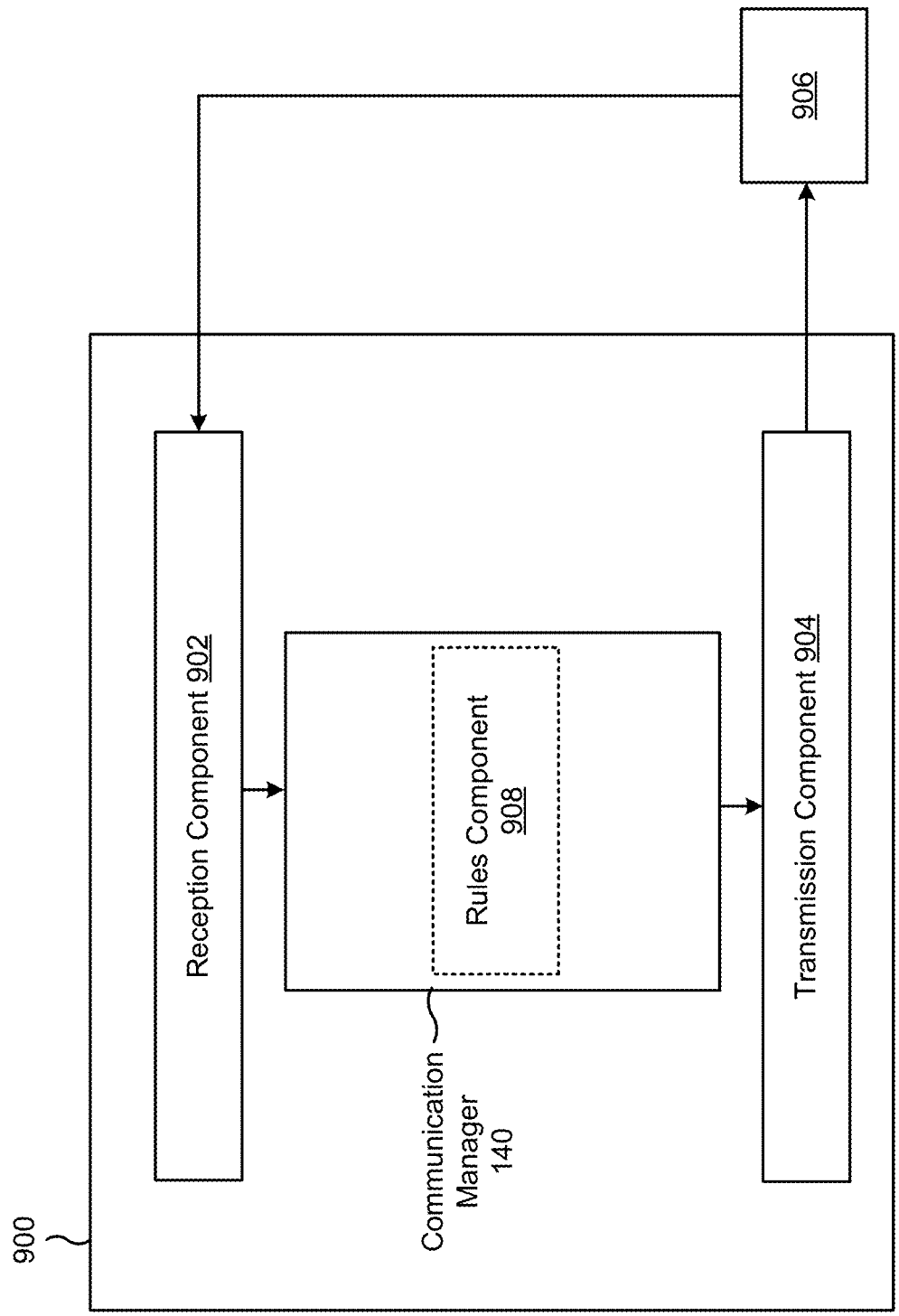
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a rules component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive configuration information identifying a plurality of PDCCH candidates that are to be monitored for DCI. In some aspects, the plurality of PDCCH candidates include a PDCCH candidate having a first aggregation level, and linked PDCCH candidates, for repetitions of DCI, having a second aggregation level. In some aspects, the PDCCH candidate overlaps with one of the linked PDCCH candidates. The reception component 902 and/or the transmission component 904 may communicate according to one or more rules that resolve an ambiguity resulting from the PDCCH candidate overlapping with the one of the linked PDCCH candidates. For example, the reception component 902 and/or the transmission component 904 may monitor PDCCH candidates for DCI, detect the DCI, decode the DCI, communicate based at least in part on one or more procedures, or the like.

The rules component 908 may determine that the overlap of the PDCCH candidate and the one of the linked PDCCH candidates is an error. The rules component 908 may determine to drop the PDCCH candidate or the one of the linked PDCCH candidates. The rules component 908 may determine to drop another one of the linked PDCCH candidates if the one of the linked PDCCH candidates is dropped. The rules component 908 may determine to monitor another one of the linked PDCCH candidates if the one of the linked PDCCH candidates is dropped.

The rules component 908 may determine that information used for performing one or more procedures is to be based at least in part on a reference PDCCH candidate of the linked PDCCH candidates. The rules component 908 may determine that information used for performing one or more procedures is to be based at least in part on an assumption that the other one of the linked PDCCH candidates is not linked to the one of the linked PDCCH candidates. The rules component 908 may determine that information used for performing one or more procedures is to be based at least in part on an assumption that the DCI is detected in the one of the linked PDCCH candidates. The rules component 908 may determine that information used for performing one or more procedures is to be based at least in part on an assumption that the DCI is detected in the PDCCH candidate that is non-linked. The rules component 908 may determine that information used for performing one or more procedures is to be based at least in part on an assumption that the DCI is detected in the one of the linked PDCCH candidates if the one of the linked PDCCH candidates is associated with a higher priority than the PDCCH candidate that is non-linked, or based at least in part on an assumption that the DCI is detected in the PDCCH candidate that is non-linked if the PDCCH candidate is associated with a higher priority than the one of the linked PDCCH candidates. In some aspects, the rules component 908 may perform the one or more procedures.

The rules component 908 may determine that the PDCCH candidate uses a first cyclic redundancy check mask associated with the first aggregation level and the one of the linked PDCCH candidates uses a second cyclic redundancy check mask associated with the second aggregation level. The rules component 908 may determine that the PDCCH candidate uses a rate matching scheme associated with the first aggregation level and the one of the linked PDCCH candidates uses a rate matching scheme associated with the second aggregation level. The rules component 908 may determine that coded bits of the PDCCH candidate use a scrambling scheme associated with the first aggregation level and coded bits of the one of the linked PDCCH candidates use a scrambling scheme associated with the second aggregation level.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
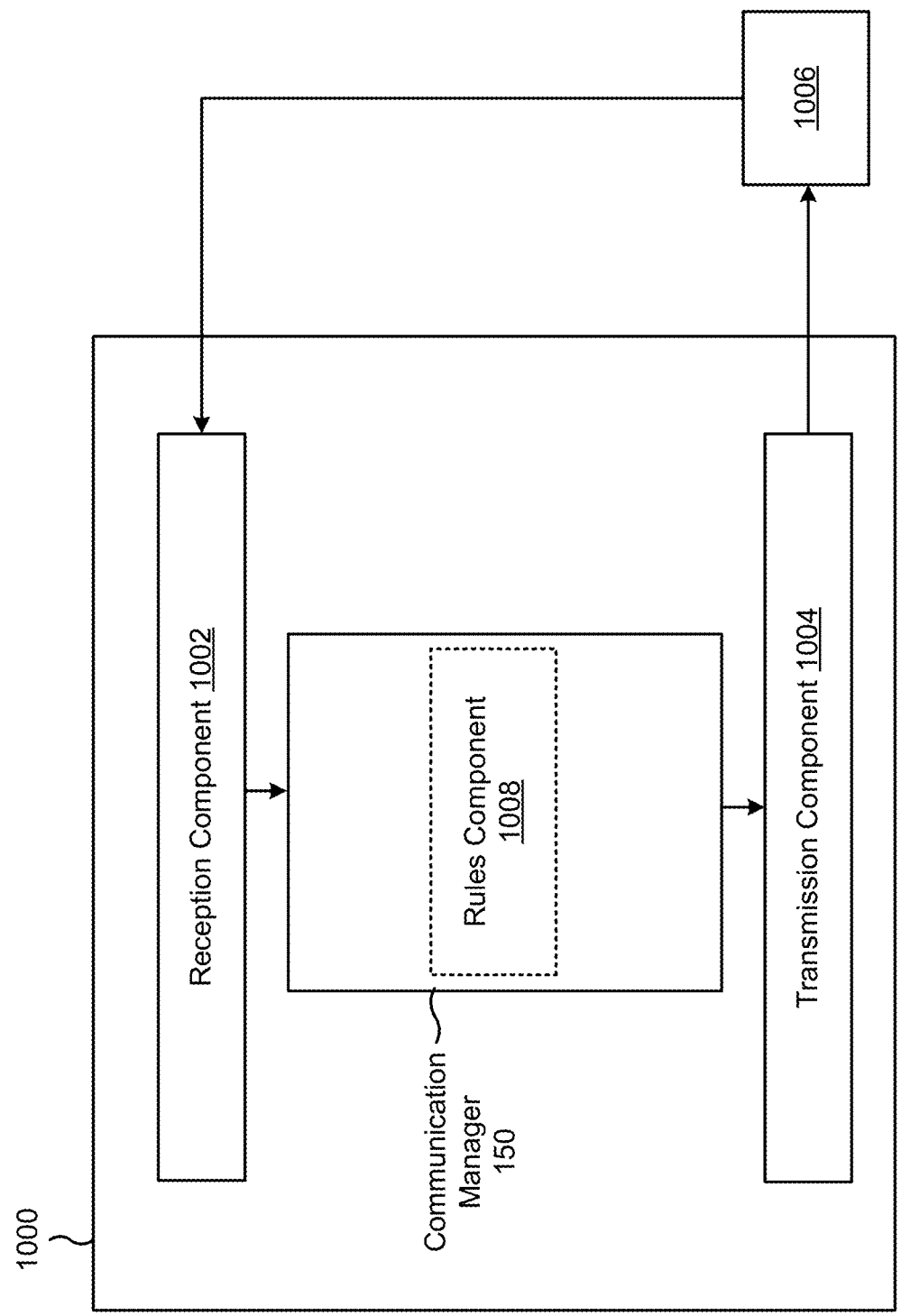

FIG. 10 is a block diagram of an example apparatus 1000 for wireless communication. The apparatus 1000 may be a network node (e.g., a base station), or a network node (e.g., a base station) may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a rules component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit configuration information identifying a plurality of PDCCH candidates that are to be monitored for DCI. In some aspects, the plurality of PDCCH candidates include a PDCCH candidate having a first aggregation level, and linked PDCCH candidates, for repetitions of DCI, having a second aggregation level. In some aspects, the PDCCH candidate overlaps with one of the linked PDCCH candidates. The transmission component 1004 and/or the reception component 1002 may communicate according to one or more rules that resolve an ambiguity resulting from the PDCCH candidate overlapping with the one of the linked PDCCH candidates. The transmission component 1004 and/or the reception component 1002 may encode DCI, transmit the DCI, communicate based at least in part on one or more procedures, or the like.

The rules component 1008 may determine that the overlap of the PDCCH candidate and the one of the linked PDCCH candidates is an error. The rules component 1008 may determine to drop the PDCCH candidate or the one of the linked PDCCH candidates. The rules component 1008 may determine to drop another one of the linked PDCCH candidates if the one of the linked PDCCH candidates is dropped. The rules component 1008 may determine to transmit the DCI using another one of the linked PDCCH candidates if the one of the linked PDCCH candidates is dropped.

The rules component 1008 may determine that information used for performing one or more procedures is to be based at least in part on a reference PDCCH candidate of the linked PDCCH candidates. The rules component 1008 may determine that information used for performing one or more procedures is to be based at least in part on an assumption that the other one of the linked PDCCH candidates is not linked to the one of the linked PDCCH candidates. The rules component 1008 may determine that information used for performing one or more procedures is to be based at least in part on an assumption that the DCI is detected in the one of the linked PDCCH candidates. The rules component 1008 may determine that information used for performing one or more procedures is to be based at least in part on an assumption that the DCI is detected in the PDCCH candidate that is non-linked. The rules component 1008 may determine that information used for performing one or more procedures is to be based at least in part on an assumption that the DCI is detected in the one of the linked PDCCH candidates if the one of the linked PDCCH candidates is associated with a higher priority than the PDCCH candidate that is non-linked, or based at least in part on an assumption that the DCI is detected in the PDCCH candidate that is non-linked if the PDCCH candidate is associated with a higher priority than the one of the linked PDCCH candidates. In some aspects, the rules component 1008 may perform the one or more procedures.

The rules component 1008 may determine that the PDCCH candidate uses a first cyclic redundancy check mask associated with the first aggregation level and the one of the linked PDCCH candidates uses a second cyclic redundancy check mask associated with the second aggregation level. The rules component 1008 may determine that the PDCCH candidate uses a rate matching scheme associated with the first aggregation level and the one of the linked PDCCH candidates uses a rate matching scheme associated with the second aggregation level. The rules component 1008 may determine that coded bits of the PDCCH candidate use a scrambling scheme associated with the first aggregation level and coded bits of the one of the linked PDCCH candidates use a scrambling scheme associated with the second aggregation level.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an apparatus for a user equipment (UE), the method comprising: receiving configuration information identifying a plurality of physical downlink control channel (PDCCH) candidates that are to be monitored for downlink control information (DCI), the plurality of PDCCH candidates including a PDCCH candidate having a first aggregation level and linked PDCCH candidates, for repetitions of DCI, having a second aggregation level, wherein the PDCCH candidate overlaps with one PDCCH candidate of the set of linked PDCCH candidates; and communicating according to one or more rules for the PDCCH candidate overlapping with the one PDCCH candidate of the set of linked PDCCH candidates.

Aspect 2: The method of Aspect 1, wherein the first aggregation level is one of 8 or 16 and the second aggregation level is the other of 8 or 16.

Aspect 3: The method of any of Aspects 1-2, wherein the PDCCH candidate and the one PDCCH candidate of the set of linked PDCCH candidates have a same starting control channel element; and wherein the PDCCH candidate and the one PDCCH candidate of the set of linked PDCCH candidates are associated with a same control resource set that has a duration of one symbol.

Aspect 4: The method of any of Aspects 1-3, further comprising: determining that the overlap of the PDCCH candidate and the one PDCCH candidate of the set of linked PDCCH candidates is an error if the PDCCH candidate and the one PDCCH candidate of the set of linked PDCCH candidates have the same starting control channel element.

Aspect 5: The method of any of Aspects 1-4, wherein communicating according to the one or more rules comprises: dropping the PDCCH candidate or the one PDCCH candidate of the set of linked PDCCH candidates.

Aspect 6: The method of Aspect 5, wherein a one of the PDCCH candidate or the one PDCCH candidate of the set of linked PDCCH candidates that is dropped has a lower priority.

Aspect 7: The method of any of Aspects 5-6, wherein communicating according to the one or more rules further comprises: dropping an other PDCCH candidate of the set of linked PDCCH candidates if the one PDCCH candidate of the set of linked PDCCH candidates is dropped.

Aspect 8: The method of any of Aspects 5-6, wherein communicating according to the one or more rules further comprises: monitoring an other PDCCH candidate of the set of linked PDCCH candidates if the one PDCCH candidate of the set of linked PDCCH candidates is dropped, wherein the DCI is detected in the other PDCCH candidate of the set of linked PDCCH candidates.

Aspect 9: The method of Aspect 8, wherein information, used for performing one or more procedures, is based at least in part on a reference PDCCH candidate of the set of linked PDCCH candidates.

Aspect 10: The method of Aspect 8, wherein information, used for performing one or more procedures, is based at least in part on an assumption that the other PDCCH candidate of the set of linked PDCCH candidates is not linked to the one PDCCH candidate of the set of linked PDCCH candidates.

Aspect 11: The method of any of Aspects 1-10, wherein, according to the one or more rules, information, used for performing one or more procedures, is based at least in part on an assumption that the DCI is detected by the UE in the one PDCCH candidate of the set of linked PDCCH candidates.

Aspect 12: The method of any of Aspects 1-10, wherein, according to the one or more rules, information, used for performing one or more procedures, is based at least in part on an assumption that the DCI is detected by the UE in the PDCCH candidate that is non-linked.

Aspect 13: The method of any of Aspects 1-10, wherein, according to the one or more rules, information, used for performing one or more procedures, is based at least in part on an assumption that the DCI is detected by the UE in the one PDCCH candidate of the set of linked PDCCH candidates if the one PDCCH candidate of the set of linked PDCCH candidates is associated with a higher priority than the PDCCH candidate that is non-linked, or based at least in part on an assumption that the DCI is detected by the UE in the PDCCH candidate that is non-linked if the PDCCH candidate is associated with a higher priority than the one PDCCH candidate of the set of linked PDCCH candidates.

Aspect 14: The method of any of Aspects 1-13, wherein, according to the one or more rules, the PDCCH candidate uses a first cyclic redundancy check mask associated with the first aggregation level, and the one PDCCH candidate of the set of linked PDCCH candidates uses a second cyclic redundancy check mask associated with the second aggregation level.

Aspect 15: The method of any of Aspects 1-14, wherein, according to the one or more rules, the PDCCH candidate uses a rate matching scheme associated with the first aggregation level, and the one PDCCH candidate of the set of linked PDCCH candidates uses a rate matching scheme associated with the second aggregation level.

Aspect 16: The method of any of Aspects 1-15, wherein, according to the one or more rules, coded bits of the PDCCH candidate use a scrambling scheme associated with the first aggregation level, and coded bits of the one PDCCH candidate of the set of linked PDCCH candidates use a scrambling scheme associated with the second aggregation level.

Aspect 17: A method of wireless communication performed by an apparatus for a network node, the method comprising: transmitting, for a user equipment (UE), configuration information identifying a plurality of physical downlink control channel (PDCCH) candidates that are to be monitored by the UE for downlink control information (DCI), the plurality of PDCCH candidates including a PDCCH candidate having a first aggregation level and a set of linked PDCCH candidates, for repetitions of DCI, having a second aggregation level, wherein the PDCCH candidate overlaps with one PDCCH candidate of the set of linked PDCCH candidates; and communicating according to one or more rules for the PDCCH candidate overlapping with the one PDCCH candidate of the set of linked PDCCH candidates.

Aspect 18: The method of Aspect 17, wherein the first aggregation level is one of 8 or 16 and the second aggregation level is the other of 8 or 16.

Aspect 19: The method of any of Aspects 17-18, wherein the PDCCH candidate and the one PDCCH candidate of the set of linked PDCCH candidates have a same starting control channel element; and the PDCCH candidate and the one PDCCH candidate of the set of linked PDCCH candidates are associated with a same control resource set that has a duration of one symbol.

Aspect 20: The method of any of Aspects 17-19, further comprising: determining that the overlap of the PDCCH candidate and the one PDCCH candidate of the set of linked PDCCH candidates is an error if the PDCCH candidate and the one PDCCH candidate of the set of linked PDCCH candidates have the same starting control channel element.

Aspect 21: The method of any of Aspects 17-20, wherein communicating according to the one or more rules comprises: dropping the PDCCH candidate or the one PDCCH candidate of the set of linked PDCCH candidates.

Aspect 22: The method of Aspect 21, wherein a one of the PDCCH candidate or the one PDCCH candidate of the set of linked PDCCH candidates that is dropped has a lower priority.

Aspect 23: The method of any of Aspects 21-22, wherein communicating according to the one or more rules further comprises: dropping an other PDCCH candidate of the set of linked PDCCH candidates if the one PDCCH candidate of the set of linked PDCCH candidates is dropped.

Aspect 24: The method of any of Aspects 21-22, wherein communicating according to the one or more rules further comprises: transmitting the DCI using an other PDCCH candidate of the set of linked PDCCH candidates if the one PDCCH candidate of the set of linked PDCCH candidates is dropped.

Aspect 25: The method of Aspect 24, wherein information, used for performing one or more procedures, is based at least in part on a reference PDCCH candidate of the set of linked PDCCH candidates.

Aspect 26: The method of Aspect 24, wherein information, used for performing one or more procedures, is based at least in part on an assumption that the other PDCCH candidate of the set of linked PDCCH candidates is not linked to the one PDCCH candidate of the set of linked PDCCH candidates.

Aspect 27: The method of any of Aspects 17-26, wherein, according to the one or more rules, information, used for performing one or more procedures, is based at least in part on an assumption that the DCI is detected by the UE in the one PDCCH candidate of the set of linked PDCCH candidates.

Aspect 28: The method of any of Aspects 17-26, wherein, according to the one or more rules, information, used for performing one or more procedures, is based at least in part on an assumption that the DCI is detected by the UE in the PDCCH candidate that is non-linked.

Aspect 29: The method of any of Aspects 17-26, wherein, according to the one or more rules, information, used for performing one or more procedures, is based at least in part on an assumption that the DCI is detected by the UE in the one PDCCH candidate of the set of linked PDCCH candidates if the one PDCCH candidate of the set of linked PDCCH candidates is associated with a higher priority than the PDCCH candidate that is non-linked, or based at least in part on an assumption that the DCI is detected by the UE in the PDCCH candidate that is non-linked if the PDCCH candidate is associated with a higher priority than the one PDCCH candidate of the set of linked PDCCH candidates.

Aspect 30: The method of any of Aspects 17-29, wherein, according to the one or more rules, the PDCCH candidate uses a first cyclic redundancy check mask associated with the first aggregation level, and the one PDCCH candidate of the set of linked PDCCH candidates uses a second cyclic redundancy check mask associated with the second aggregation level.

Aspect 31: The method of any of Aspects 17-30, wherein, according to the one or more rules, the PDCCH candidate uses a rate matching scheme associated with the first aggregation level, and the one PDCCH candidate of the set of linked PDCCH candidates uses a rate matching scheme associated with the second aggregation level.

Aspect 32: The method of any of Aspects 17-31, wherein, according to the one or more rules, coded bits of the PDCCH candidate use a scrambling scheme associated with the first aggregation level, and coded bits of the one PDCCH candidate of the set of linked PDCCH candidates use a scrambling scheme associated with the second aggregation level.

Aspect 33: An apparatus for wireless communication at a device, comprising a processor; memory coupled with the processor; and instructions stored in the memory and executable by the processor to cause the apparatus to perform the method of one or more Aspects of Aspects 1-16.

Aspect 34: A device for wireless communication, comprising a memory and one or more processors coupled to the memory, the memory and the one or more processors configured to perform the method of one or more Aspects of Aspects 1-16.

Aspect 35: An apparatus for wireless communication, comprising at least one means for performing the method of one or more Aspects of Aspects 1-16.

Aspect 36: A non-transitory computer-readable medium storing code for wireless communication, the code comprising instructions executable by a processor to perform the method of one or more Aspects of Aspects 1-16.

Aspect 37: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 38: An apparatus for wireless communication at a device, comprising a processor; memory coupled with the processor; and instructions stored in the memory and executable by the processor to cause the apparatus to perform the method of one or more Aspects of Aspects 17-32.

Aspect 39: A device for wireless communication, comprising a memory and one or more processors coupled to the memory, the memory and the one or more processors configured to perform the method of one or more Aspects of Aspects 17-32.

Aspect 40: An apparatus for wireless communication, comprising at least one means for performing the method of one or more Aspects of Aspects 17-32.

Aspect 41: A non-transitory computer-readable medium storing code for wireless communication, the code comprising instructions executable by a processor to perform the method of one or more Aspects of Aspects 17-32.

Aspect 42: A non-transitory computer-readable medium storing a set of instructions for wireless communication, the set of instructions comprising one or more instructions that, when executed by one or more processors of a device, cause the device to perform the method of one or more Aspects of Aspects 17-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), the apparatus comprising:
a memory; and
one or more processors, coupled to the memory, configured to:
receive configuration information identifying a physical downlink control channel (PDCCH) candidate and a set of linked PDCCH candidates that are to be monitored for downlink control information (DCI), wherein the PDCCH candidate has a first aggregation level and the set of linked PDCCH candidates are for repetitions of DCI and have a second aggregation level, and
wherein the PDCCH candidate and one or more PDCCH candidates of the set of linked PDCCH candidates are overlapping and associated with a same control resource set; and
communicate according to one or more rules for the PDCCH candidate overlapping with the one or more PDCCH candidates of the set of linked PDCCH candidates.

2. The apparatus of claim 1, wherein the first aggregation level is one of 8 or 16 and the second aggregation level is the other of 8 or 16.

3. The apparatus of claim 1, wherein the PDCCH candidate and the one or more PDCCH candidates of the set of linked PDCCH candidates have a same starting control channel element; and
wherein the same control resource set has a duration of one symbol.

4. The apparatus of claim 3, wherein the same control resource set is configured with non-interleaved control channel element-to-resource element group mapping.

5. The apparatus of claim 1, wherein the one or more processors are further configured to:
determine that the overlap of the PDCCH candidate and the one or more PDCCH candidates of the set of linked PDCCH candidates is an error if the PDCCH candidate and the one or more PDCCH candidates of the set of linked PDCCH candidates have the same starting control channel element.

6. The apparatus of claim 5, wherein the PDCCH candidate is linked with another PDCCH candidate.

7. The apparatus of claim 1, wherein, according to the one or more rules, information, used for performing one or more procedures, is based at least in part on an assumption that the DCI is detected by the UE in the one or more PDCCH candidates of the set of linked PDCCH candidates.

8. The apparatus of claim 1, wherein the one or more processors, to communicate according to the one or more rules, are configured to:
drop the PDCCH candidate or the one or more PDCCH candidates of the set of linked PDCCH candidates.

9. The apparatus of claim 8, wherein a one of the PDCCH candidate or the one or more PDCCH candidates of the set of linked PDCCH candidates that are dropped has a lower priority.

10. The apparatus of claim 8, wherein the one or more processors, to communicate according to the one or more rules, are configured to:
drop an other PDCCH candidate of the set of linked PDCCH candidates if the one or more PDCCH candidates of the set of linked PDCCH candidates are dropped.

11. The apparatus of claim 8, wherein the one or more processors, to communicate according to the one or more rules, are configured to:
monitor an other PDCCH candidate of the set of linked PDCCH candidates if one or more PDCCH candidates of the set of linked PDCCH candidates are dropped,
wherein the DCI is detected in the other PDCCH candidate of the set of linked PDCCH candidates.

12. The apparatus of claim 11, wherein information, used for performing one or more procedures, is based at least in part on a reference PDCCH candidate of the set of linked PDCCH candidates.

13. The apparatus of claim 11, wherein information, used for performing one or more procedures, is based at least in part on an assumption that the other PDCCH candidate of the set of linked PDCCH candidates is not linked to the one or more PDCCH candidates of the set of linked PDCCH candidates.

14. The apparatus of claim 1, wherein, according to the one or more rules, information, used for performing one or more procedures, is based at least in part on an assumption that the DCI is detected by the UE in the PDCCH candidate that is non-linked.

15. The apparatus of claim 1, wherein, according to the one or more rules, information, used for performing one or more procedures, is based at least in part on an assumption that the DCI is detected by the UE in the one or more PDCCH candidates of the set of linked PDCCH candidates if the one or more PDCCH candidates of the set of linked PDCCH candidates are associated with a higher priority than the PDCCH candidate that is non-linked, or based at least in part on an assumption that the DCI is detected by the UE in the PDCCH candidate that is non-linked if the PDCCH candidate is associated with a higher priority than the one or more PDCCH candidates of the set of linked PDCCH candidates.

16. An apparatus for wireless communication at a network node, the apparatus comprising:
a memory; and
one or more processors, coupled to the memory, configured to:
transmit, for a user equipment (UE), configuration information identifying a physical downlink control channel (PDCCH) candidate and a set of linked PDCCH candidates that are to be monitored for downlink control information (DCI),
wherein the PDCCH candidate has a first aggregation level and the set of linked PDCCH candidates are for repetitions of DCI and have a second aggregation level, and
wherein the PDCCH candidate and one or more PDCCH candidates of the set of linked PDCCH candidates are overlapping and associated with a same control resource set; and
communicate according to one or more rules for the PDCCH candidate overlapping with the one or more PDCCH candidates of the set of linked PDCCH candidates.

17. The apparatus of claim 16, wherein the first aggregation level is one of 8 or 16 and the second aggregation level is the other of 8 or 16.

18. The apparatus of claim 16, wherein the PDCCH candidate and the one or more PDCCH candidates of the set of linked PDCCH candidates have a same starting control channel element; and
wherein the same control resource set has a duration of one symbol.

19. The apparatus of claim 18, wherein the same control resource set is configured with non-interleaved control channel element-to-resource element group mapping.

20. The apparatus of claim 16, wherein the one or more processors are further configured to:
    determine that the overlap of the PDCCH candidate and the one or more PDCCH candidates of the set of linked PDCCH candidates is an error if the PDCCH candidate and the one or more PDCCH candidates of the set of linked PDCCH candidates have the same starting control channel element.

21. The apparatus of claim 20, wherein the PDCCH candidate is linked with another PDCCH candidate.

22. The apparatus of claim 16, wherein, according to the one or more rules, information, used for performing one or more procedures, is based at least in part on an assumption that the DCI is detected by the UE in the one or more PDCCH candidates of the set of linked PDCCH candidates.

23. The apparatus of claim 16, wherein the one or more processors, to communicate according to the one or more rules, are configured to:
    drop the PDCCH candidate or the one or more PDCCH candidates of the set of linked PDCCH candidates.

24. The apparatus of claim 23, wherein a one of the PDCCH candidate or the one or more PDCCH candidates of the set of linked PDCCH candidates that are dropped has a lower priority.

25. The apparatus of claim 23, wherein the one or more processors, to communicate according to the one or more rules, are configured to:
    drop an other PDCCH candidate of the set of linked PDCCH candidates if the one or more PDCCH candidates of the set of linked PDCCH candidates is dropped.

26. The apparatus of claim 23, wherein the one or more processors, to communicate according to the one or more rules, are configured to:
    transmit the DCI using an other PDCCH candidate of the set of linked PDCCH candidates if the one or more PDCCH candidates of the set of linked PDCCH candidates are dropped.

27. The apparatus of claim 26, wherein information, used for performing one or more procedures, is based at least in part on a reference PDCCH candidate of the set of linked PDCCH candidates.

28. The apparatus of claim 26, wherein information, used for performing one or more procedures, is based at least in part on an assumption that the other PDCCH candidate of the set of linked PDCCH candidates is not linked to the one or more PDCCH candidates of the set of linked PDCCH candidates.

29. The apparatus of claim 16, wherein, according to the one or more rules, information, used for performing one or more procedures, is based at least in part on an assumption that the DCI is detected by the UE in the PDCCH candidate that is non-linked.

30. The apparatus of claim 16, wherein, according to the one or more rules, information, used for performing one or more procedures, is based at least in part on an assumption that the DCI is detected by the UE in the one or more PDCCH candidates of the set of linked PDCCH candidates if the one or more PDCCH candidates of the set of linked PDCCH candidates are associated with a higher priority than the PDCCH candidate that is non-linked, or based at least in part on an assumption that the DCI is detected by the UE in the PDCCH candidate that is non-linked if the PDCCH candidate is associated with a higher priority than the one or more PDCCH candidates of the set of linked PDCCH candidates.

31. A method of wireless communication performed by an apparatus for a user equipment (UE), the method comprising:
    receiving configuration information identifying a physical downlink control channel (PDCCH) candidate and a set of linked PDCCH candidates that are to be monitored for downlink control information (DCI),
        wherein the PDCCH candidate has a first aggregation level and the set of linked PDCCH candidates are for repetitions of DCI and have a second aggregation level, and
        wherein the PDCCH candidate and one or more PDCCH candidates of the set of linked PDCCH candidates are overlapping and associated with a same control resource set; and
    communicating according to one or more rules for the PDCCH candidate overlapping with the one or more PDCCH candidates of the set of linked PDCCH candidates.

32. The method of claim 31, wherein the first aggregation level is one of 8 or 16 and the second aggregation level is the other of 8 or 16.

33. The method of claim 31, wherein the PDCCH candidate and the one or more PDCCH candidates of the set of linked PDCCH candidates have a same starting control channel element; and
    wherein the same control resource set has a duration of one symbol.

34. The method of claim 33, wherein the same control resource set is configured with non-interleaved control channel element-to-resource element group mapping.

35. The method of claim 31, further comprising:
    determining that the overlap of the PDCCH candidate and the one or more PDCCH candidates of the set of linked PDCCH candidates is an error if the PDCCH candidate and the one or more PDCCH candidates of the set of linked PDCCH candidates have the same starting control channel element.

36. The method of claim 35, wherein the PDCCH candidate is linked with another PDCCH candidate.

37. The method of claim 31, wherein, according to the one or more rules, information, used for performing one or more procedures, is based at least in part on an assumption that the DCI is detected by the UE in the one or more PDCCH candidates of the set of linked PDCCH candidates.

38. A method of wireless communication performed by an apparatus for a network node, the method comprising:
    transmitting, for a user equipment (UE), configuration information identifying physical downlink control channel (PDCCH) candidate and a set of linked PDCCH candidates that are to be monitored for downlink control information (DCI),
        wherein the PDCCH candidate has a first aggregation level and the set of linked PDCCH candidates are for repetitions of DCI and have a second aggregation level, and
    wherein the PDCCH candidate and one or more PDCCH candidates of the set of linked PDCCH candidates are overlapping and associated with a same control resource set; and
    communicating according to one or more rules for the PDCCH candidate overlapping with the one or more PDCCH candidates of the set of linked PDCCH candidates.

39. The method of claim 38, wherein the first aggregation level is one of 8 or 16 and the second aggregation level is the other of 8 or 16.

40. The method of claim 38, wherein the PDCCH candidate and the one or more PDCCH candidates of the set of linked PDCCH candidates have a same starting control channel element; and
wherein the same control resource set has a duration of one symbol.

41. The method of claim 40, wherein the same control resource set is configured with non-interleaved control channel element-to-resource element group mapping.

42. The method of claim 38, further comprising:
determining that the overlap of the PDCCH candidate and the one or more PDCCH candidates of the set of linked PDCCH candidates is an error if the PDCCH candidate and the one or more PDCCH candidates of the set of linked PDCCH candidates have the same starting control channel element.

43. The method of claim 42, wherein the PDCCH candidate is linked with another PDCCH candidate.

44. The method of claim 38, wherein, according to the one or more rules, information, used for performing one or more procedures, is based at least in part on an assumption that the DCI is detected by the UE in the one or more PDCCH candidates of the set of linked PDCCH candidates.

* * * * *